US011223534B2

(12) United States Patent
Avery et al.

(10) Patent No.: US 11,223,534 B2
(45) Date of Patent: Jan. 11, 2022

(54) SYSTEMS AND METHODS FOR HUB AND SPOKE CROSS TOPOLOGY TRAVERSAL

(71) Applicant: Virtual Instruments Worldwide, Inc., San Jose, CA (US)

(72) Inventors: Devin Blinn Avery, Madbury, NH (US); Francis Niestemski, Longmeadow, MA (US); Ryan E. Perkowski, Middletown, DE (US); Nicholas York, San Ramon, CA (US); Leo Szumel, South Lake Tahoe, CA (US); Dale Coldiron, San Jose, CA (US)

(73) Assignee: Virtual Instruments Worldwide, Inc., San Jose, CA (US)

( * ) Notice: Subject to any disclaimer, the term of this patent is extended or adjusted under 35 U.S.C. 154(b) by 221 days.

(21) Appl. No.: 16/669,492

(22) Filed: Oct. 30, 2019

(65) Prior Publication Data

US 2020/0145296 A1    May 7, 2020

Related U.S. Application Data

(63) Continuation-in-part of application No. 16/234,440, filed on Dec. 27, 2018, now Pat. No. 10,747,569.

(Continued)

(51) Int. Cl.
*H04L 12/24* (2006.01)
*G06F 13/38* (2006.01)
*H04L 12/755* (2013.01)

(52) U.S. Cl.
CPC ............ *H04L 41/12* (2013.01); *G06F 13/385* (2013.01); *H04L 41/22* (2013.01); *H04L 45/021* (2013.01)

(58) Field of Classification Search
CPC ....... H04L 41/12; H04L 41/22; H04L 45/021; G06F 13/385
See application file for complete search history.

(56) References Cited

U.S. PATENT DOCUMENTS 7,185,192 B1    2/2007  Kahn
7,193,968 B1    3/2007  Kapoor et al.
(Continued)

FOREIGN PATENT DOCUMENTS

EP    2262173    12/2010

OTHER PUBLICATIONS

Bhumip Khasnabish "Emerging Enterprise Storage Systems: Storage or System Area Networks (SANs)", [Online], pp. 192-195, [Retrieved from Internet on Aug. 25, 2021], <https://www.igi-global.com/viewtitlesample.aspx?id=18422&ptid=383&t>, (Year: 2002).*

(Continued)

*Primary Examiner* — Ziaul A Chowdhury
(74) *Attorney, Agent, or Firm* — Ahmann Kloke LLP

(57) ABSTRACT

A method comprising: receiving object identifiers associated with each entity of an enterprise network, receiving relationship data indicating directionality of data flow between two or more entities of enterprise network, receiving search query which includes at least one of an object identifier associated with one of the entities or relationship data indicating directionality of data flow associated with one of the entities, traversing a portion of topology to identify objects of the portion of the topology and a pivot point, the pivot point being directionally coupled to at least three objects, identifying two mini-topologies based on two of the least three objects of the pivot point, traversing each of the two mini-topologies to identify further objects within the portion of the topology, generating a partial topology based on the traversal of the portion of the topology and of the (Continued)

mini-topologies, and providing information including objects identified in the partial topology.

14 Claims, 21 Drawing Sheets

Related U.S. Application Data

(60) Provisional application No. 62/752,794, filed on Oct. 30, 2018, provisional application No. 62/611,892, filed on Dec. 29, 2017.

(56) References Cited

U.S. PATENT DOCUMENTS

| | | | |
|---|---|---|---|
| 7,634,595 B1 | 12/2009 | Brown | |
| 8,065,133 B1 | 11/2011 | Asbridge | |
| 8,495,611 B2 | 7/2013 | McCarthy | |
| 9,026,687 B1 | 5/2015 | Govande | |
| 9,928,183 B2 | 3/2018 | Svendsen | |
| 10,044,566 B1 | 8/2018 | Grisco | |
| 10,216,812 B2 | 2/2019 | Witkop | |
| 10,505,959 B1 | 12/2019 | Wang | |
| 10,735,430 B1 | 8/2020 | Stoler | |
| 2002/0083169 A1 | 6/2002 | Aki | |
| 2002/0156883 A1 | 10/2002 | Natarajan | |
| 2003/0167327 A1 | 9/2003 | Baldwin | |
| 2004/0083285 A1* | 4/2004 | Nicolson | H04L 41/046 709/224 |
| 2005/0081208 A1 | 4/2005 | Gargya | |
| 2005/0229182 A1 | 10/2005 | Grover | |
| 2006/0184626 A1 | 8/2006 | Agapi | |
| 2006/0242647 A1 | 10/2006 | Kimbrel | |
| 2006/0271677 A1 | 11/2006 | Mercier | |
| 2007/0136541 A1 | 6/2007 | Herz | |
| 2008/0019499 A1 | 1/2008 | Benfield | |
| 2008/0104248 A1 | 5/2008 | Yahiro | |
| 2009/0016236 A1 | 1/2009 | Alcala | |
| 2009/0106256 A1 | 4/2009 | Safari | |
| 2009/0241113 A1 | 9/2009 | Seguin | |
| 2009/0259749 A1 | 10/2009 | Barrett | |
| 2009/0319580 A1 | 12/2009 | Lorenz | |
| 2011/0107148 A1 | 5/2011 | Franklin | |
| 2011/0225017 A1 | 9/2011 | Radhakrishnan | |
| 2012/0030352 A1 | 2/2012 | Sauma Vargas | |
| 2012/0044811 A1 | 2/2012 | White | |
| 2012/0076001 A1 | 3/2012 | Saitou | |
| 2012/0089726 A1 | 4/2012 | Doddavula | |
| 2012/0131593 A1 | 5/2012 | DePetro | |
| 2012/0192197 A1 | 7/2012 | Doyle | |
| 2013/0060932 A1 | 3/2013 | Ofek | |
| 2013/0117847 A1 | 5/2013 | Friedman | |
| 2013/0152200 A1 | 6/2013 | Alme | |
| 2014/0112187 A1 | 4/2014 | Kang | |
| 2014/0173034 A1 | 6/2014 | Liu | |
| 2014/0313937 A1* | 10/2014 | Roper | H04L 45/02 370/255 |
| 2014/0331277 A1 | 11/2014 | Frascadore | |
| 2014/0358972 A1 | 12/2014 | Guarrieri et al. | |
| 2015/0074251 A1 | 3/2015 | Tameshige | |
| 2016/0004475 A1 | 1/2016 | Beniyama | |
| 2016/0044035 A1 | 2/2016 | Huang | |
| 2016/0100066 A1 | 4/2016 | Yamada | |
| 2016/0119234 A1 | 4/2016 | Valencia Lopez | |
| 2016/0359897 A1 | 12/2016 | Yadav | |
| 2017/0085456 A1 | 3/2017 | Whitner | |
| 2017/0123849 A1 | 5/2017 | Tian | |
| 2017/0168866 A1 | 6/2017 | Kono | |
| 2017/0317899 A1 | 11/2017 | Taylor | |
| 2018/0067776 A1 | 3/2018 | Chen | |
| 2018/0081501 A1 | 3/2018 | Johnston | |
| 2018/0115585 A1 | 4/2018 | Rubakha | |
| 2018/0165451 A1 | 6/2018 | Kawakita | |
| 2018/0262432 A1 | 9/2018 | Ozen | |
| 2018/0324045 A1 | 11/2018 | Grisco | |
| 2018/0329794 A1* | 11/2018 | Prieto | G06F 11/3006 |
| 2019/0065230 A1 | 2/2019 | Tsirkin | |
| 2019/0073239 A1 | 3/2019 | Konnath | |
| 2019/0089617 A1 | 3/2019 | Raney | |
| 2019/0163589 A1 | 5/2019 | McBride | |
| 2019/0207837 A1 | 7/2019 | Malhotra | |
| 2019/0207841 A1 | 7/2019 | Perkowski | |
| 2019/0243671 A1 | 8/2019 | Yadav | |
| 2021/0044484 A1* | 2/2021 | Huang | H04L 41/12 |

OTHER PUBLICATIONS

Vladimir V. Riabov, "Storage Area Networks (SANs)", [Online], pp. 1-11, [Retrieved from Internet on Aug. 25, 2021], <https://citeseerx.ist.psu.edu/viewdoc/download?doi=10.1.1.198.3062&rep=rep1&type=pdf> (Year: 2005).*

Suresh Muknahallipatna et al., "The Effect of End to End Latency in a Distributed Storage Area Network on Microsoft Exchange Server 2003 Performance", [Online], pp. 1-9, [Retrieved from Inter3ent on Aug. 25, 2021], <https://ieeexplore.ieee.org/stamp/stamp.jsp?arnumber=1367226> (Year: 2004).*

T. Brothers, N. Mandagere et al., "Microsoft Exchange Implementation on A Distributed Storage Area Network", [Online], pp. 251-251, [Retrieved from Internet on Aug. 25, 2021], <https://www.proquest.com/openview/778199c5224ef19750ea8e897edd9b7b/1.pdf>, (Year: 2008).*

International Application No. PCT/US2019/058976, Search Report and Written Opinion dated Mar. 25, 2020.

International Application No. PCT/US2019/059282, Search Report and Written Opinion dated Apr. 7, 2020.

Chandramouli, Ramaswamy, "Security Assurance Requirements for Hypervisor Deployment Features," Seventh International Conference on Digital Society, Feb. 2013.

Ramamoorthy, S. et al. "A Preventive Method for Host Level Security in Cloud Infrastructure," Proceedings of the 3rd International Symposium on Big Data and Cloud Computing Challenges, Feb. 2016.

Sethi, Chhabi et al., "Trusted-Cloud: A Cloud Security Model for Infrastructure as a Service (IaaS)," International Journal of Advanced Research in Computer Science and Software Engineering, vol. 6, No. 3, Mar. 2016.

Urias, Vincent E. et al., "Hypervisor Assisted Forensics and Incident Response in the Cloud," 2016 IEEE International Conference on Computer and Information Technology, Dec. 2016.

Androulidakis, G. et al., "Improving Network Anomaly Detection via Selective Flow-Based Sampling," IET Communications, vol. 2, No. 3, pp. 399-409, Mar. 2008.

Cejka, Tomas et al., "NEMEA: A Framework for Network Traffic Analysis," Proceedings of the 12th Conference on Network and Service Management (CNSM 2016), pp. 195-201, Nov. 2016.

Kind, Andreas et al., "Histogram-Based Traffic Anomaly Detection," IEEE Transactions on Network Service Management, vol. 6, No. 2, pp. 110-121, Jun. 2009.

Wang, Wei et al., "Network Traffic Monitoring, Analysis and Anomaly Detection," Guest Editorial, IEEE Network, pp. 6-7, May 2011.

International Application No. PCT/US2018/067760, Search Report and Written Opinion dated Mar. 8, 2019.

* cited by examiner

SYSTEMS AND METHODS FOR HUB AND SPOKE CROSS TOPOLOGY TRAVERSAL

CROSS-REFERENCE TO RELATED APPLICATIONS

The present application claims benefit of U.S. Provisional Patent Application Ser. No. 62/752,794, filed Oct. 30, 2018 and entitled "Methods and Systems for Hub and Spoke Cross Topology Traversal," which is incorporated by reference herein, and the present application is a continuation in part of the U.S. Nonprovisional patent application Ser. No. 16/234,440, filed Dec. 27, 2018 and entitled "Systems and Methods of Discovering and Traversing Coexisting Topologies," which claims benefits of U.S. Provisional Patent Application Ser. No. 62/611,892, filed Dec. 29, 2017 and entitled "Systems and Methods for Performance Management of Data Infrastructure," which is incorporated by reference herein. In addition, the following applications filed on Dec. 27, 2018 are incorporated by reference herein: U.S. Nonprovisional patent application Ser. No. 16/234,353 entitled "System and Method of Application Discovery," U.S. Nonprovisional patent application Ser. No. 16/234,384 entitled "Systems and Methods of Application-Aware Improvement of Storage Network Traffic," U.S. Nonprovisional patent application Ser. No. 16/234,402 entitled "System and Method of Flow Source Discovery," U.S. Nonprovisional patent application Ser. No. 16/234,424 entitled "System and Method of Dynamically Assigning Device Tiers Based on Application," and U.S. Nonprovisional patent application Ser. No. 16/234,452 entitled "System and Method of Cross-Silo Discovery and Mapping of Storage, Hypervisors and Other Network Objects."

FIELD OF THE INVENTION

Embodiments of the present invention(s) related generally to discovering and traversing coexisting topologies of an enterprise network.

BACKGROUND

Complexity of enterprise networks has increased to a point where even information technology (IT) administrators may not be aware of the computing and storage resources on which mission-critical applications of the organization are running on.

Enterprise networks consist of computing and storage resources designed to run business-related applications of an organization. Applications of the enterprise network, includes for example email service, web service, database, customer relationship management (CRM), data file, virtual desktop infrastructure (VDI), enterprise resource planning (ERP), and the like.

Enterprise networks are increasingly moving towards a combination of on-premise and cloud-based infrastructure, making the ability to determine computing and storage resources associated with business-related application more difficult.

Corporations demand acceptable levels of performance, reliability, redundancy, and security from its computing and storage devices. One way to achieve performance, reliability, and redundancy is to provide more resources than the computing environment would ever need. Unfortunately, the cost of information technology equipment, software and personnel can be prohibitively expensive, and runs contrary to an overall goal of an enterprise of profitability. Every corporation must strike a balance between the cost of additional computing and storage versus performance, reliability and redundancy benefits of the additional computing and storage resources.

One way for IT administrators to monitor aspects of the increasingly complex enterprise network is with assistance from a wide variety of standalone and integrated software tools available to aid in the monitoring various aspects of the enterprise network. These tools include standalone software such as IT management software, application performance software, and software to create a server-based storage area network.

For example, software-defined storage products allow enterprises to create a server-based storage area network (SAN) from local application server using existing storage devices. These software-defined storage products have the capability to convert direct attached storage (DAS) into shared block storage, may be installed in existing storage devices, and may be integrated into storage devices produced by certain manufacturers. However, different standalone or integrated software may capture data regarding different aspects of the enterprise network. For example, IP network traffic may provide data such as the speed of each hop from the router to a host but would not capture data regarding attributes of the host such as the operating system running on the host, or CPU usage of the host. Furthermore, data provided by each standalone or integrated software may be viewed on their own platform, and may be isolated from one another, making it difficult to monitor the performance, health and capacity of entities of the enterprise network. The entities of the enterprise network include applications, storage arrays, virtual machines and the like.

In one example involving difficulty of identifying the root of a problem, a user of an enterprise network complains of slow response of the virtual desktop application of the enterprise network. The IT administrator may run a diagnostic, using storage performance monitoring tools, on one or more storage resources on which the VDI application is known to be running. The storage performance monitoring tool may determine that no storage performance problem exists. A common response to the issue may be to increase the storage array capacity of the enterprise network, which may not result in an improvement in response time of the storage array. The software integrated in routers of the enterprise network may not be able to pin point reasons for the slow response of the VDI application, since this software would only have access data regarding traffic on the routers, and not the performance of other entities of the VDI application connected to the routers.

SUMMARY

An example system comprising one or more processors. The memory containing instructions configured to control the one or more processors to receive object identifiers associated with each entity of a plurality of entities of an enterprise network, receive relationship data indicating directionality of data flow between two or more entities of the plurality of entities of the enterprise network, receive, from a user, a first search query, the first search query including at least one of an object identifier associated with one of the plurality of entities or relationship data indicating directionality of data flow associated with one of the plurality of entities in an enterprise network, traverse at least a portion of a topology of the enterprise network based on the first search query to identify objects of the at least the portion of the topology and a pivot point, the pivot point being directionally coupled to at least three objects of the enterprise network, identify at least two mini-topologies based on at least two objects of the at least three objects of the pivot point, traverse each of the at least two mini-topologies based on the at least two objects of the at least three objects of the pivot point to identify further objects within the at least the portion of the topology, generate at least a partial topology of the enterprise network based on the traversal of the at least the portion of the topology and the traversal of the mini-topologies and provide an object identification information including objects identified in the at least the partial topology.

In various embodiments, the pivot point is a host bus adapter card. In some embodiments, the relationship data associated with the host bus adapter card indicates data flowing out of a host object to the host bus adapter card and data flows out at least two ports of the host bus adapter. In one embodiment, the relationship data associated with the host bus adapter card indicates data flowing out from the host bus adapter to a host object and data flows into at least two ports of the host bus adapter. In one example, the plurality of entities of the enterprise network includes one or more of: storage volume, storage port, storage pool, disks, input/output (I/O) groups, and nodes. In some embodiments, providing the object identification information including objects identified in the at least the partial topology includes generating a table of the object identification information. In one embodiment, providing the object identification information including objects identified in the at least the partial topology includes generating a graphical representation of objects identified in the at least the partial topology.

An example system may comprise one or more processors. The memory containing instructions configured to control the one or more processors to: receive from a third party virtualization platform: a plurality of virtual machine manager identifiers, each of the plurality of virtual machine manager identifiers identifying at least one of a plurality of virtual machine managers of the enterprise network, a plurality of hypervisor identifiers, each of the plurality of hypervisor identifiers identifying at least one of a plurality of hypervisors of the enterprise network, and a plurality of virtual machine identifiers, each of the plurality of virtual machine identifiers identifying at least one of a plurality of virtual machines of the enterprise network, generate a first logical mapping of each of a plurality virtual machine managers to hypervisors, the first logical mapping identifying hypervisors managed by virtual machine mangers, the identifying based on the virtual machine identifiers and the hypervisor identifiers, generate a second logical mapping of each of a plurality of hypervisors to virtual machines, the second logical mapping identifying the virtual machines managed by each of the plurality of hypervisors, the identifying based on the hypervisor identifiers and the virtual machine identifiers, generate a third logical mapping of one of the plurality of virtual machines to other virtual machines of the enterprise network, the identifying based on the plurality of virtual machine identifiers, receive from at least one network probe: hypervisor traffic data, the hypervisor traffic data identifying communication between one of the plurality of hypervisors of the enterprise network and entities of a switch fabric of the enterprise network, entities of the switch fabric including switches, and virtual machine traffic data, the virtual machine traffic identifying communication between the one of the plurality of virtual machines of the enterprise network to entities of the switch fabric of the enterprise network, generate a fourth logical mapping of the plurality of hypervisors to the entities of the switch fabric of the enterprise network, the mapping based on the hypervisor traffic data, generate a fifth logical mapping one of the plurality of virtual machines of the enterprise network to the entities of the switch fabric of the enterprise network, the mapping based on the virtual machine traffic data, and output a master mapping, the master mapping based on the first logical mapping, the second logical mapping, the fourth logical mapping and the fifth logical mapping.

In various embodiments, the system further comprising receive application data from a first application performance platform application data or a second application performance platform. The first application performance platform or the second application performance platform may be in communication with entities of the enterprise network. In some embodiments, the application data includes application identifiers, the application identifiers identifying at least one of a plurality of application instances of the enterprise network. In some embodiments, In some embodiments, the application identifiers identify a plurality of entities which make up the at least one plurality of application instances of the enterprise network, the entities of the enterprise network including at least one of the plurality of virtual machine managers, the plurality of hypervisors, the switch fabric, and/or a plurality of physical devices. In various embodiments, the system further comprising generating a sixth logical mapping of one of the plurality of application instances of the enterprise network. In some embodiments, the system further comprising receive from a plurality of data probes network data, the plurality of data probes integrated within the entities of enterprise network. In various embodiments, the at least one network probes are configured to further receive network traffic data, the network traffic identifying communication between entities of the enterprise network, the entities of the enterprise network includes at least one of the plurality of virtual machine managers, the plurality of hypervisors, the switch fabric, and/or a plurality of physical devices.

An example method comprises receiving from a third party virtualization platform: a plurality of virtual machine manager identifiers, each of the plurality of virtual machine manager identifiers identifying at least one of a plurality of virtual machine managers of the enterprise network, a plurality of hypervisor identifiers, each of the plurality of hypervisor identifiers identifying at least one of a plurality of hypervisors of the enterprise network, and a plurality of virtual machine identifiers, each of the plurality of virtual machine identifiers identifying at least one of a plurality of virtual machines of the enterprise network, generating a first logical mapping of each of a plurality virtual machine managers to hypervisors, the first logical mapping identifying hypervisors managed by virtual machine mangers, the identifying based on the virtual machine identifiers and the hypervisor identifiers, generating a second logical mapping of each of a plurality of hypervisors to virtual machines, the second logical mapping identifying the virtual machines managed by each of the plurality of hypervisors, the identifying based on the hypervisor identifiers and the virtual machine identifiers, generating a third logical mapping of one of the plurality of virtual machines to other virtual machines of the enterprise network, the identifying based on the plurality of virtual machine identifiers, receiving from at least one network probe: hypervisor traffic data, the hypervisor traffic data identifying communication between one of the plurality of hypervisors of the enterprise network and entities of a switch fabric of the enterprise network, entities of the switch fabric including switches, and virtual machine traffic data, the virtual machine traffic identifying communication between the one of the plurality of virtual machines of the enterprise network to entities of the switch fabric of the enterprise network, generating a fourth logical mapping of the plurality of hypervisors to the entities of the switch fabric of the enterprise network, the mapping based on the hypervisor traffic data, generating a fifth logical mapping one of the plurality of virtual machines of the enterprise network to the entities of the switch fabric of the enterprise network, the mapping based on the virtual machine traffic data, and outputting a master mapping, the master mapping based on the first logical mapping, the second logical mapping, the fourth logical mapping and the fifth logical mapping.

A computer program product comprising a computer readable storage medium having program code embodied therewith, the program code executable by a computing system to cause the computing system to perform: receiving from a third party virtualization platform: a plurality of virtual machine manager identifiers, each of the plurality of virtual machine manager identifiers identifying at least one of a plurality of virtual machine managers of the enterprise network, a plurality of hypervisor identifiers, each of the plurality of hypervisor identifiers identifying at least one of a plurality of hypervisors of the enterprise network, and a plurality of virtual machine identifiers, each of the plurality of virtual machine identifiers identifying at least one of a plurality of virtual machines of the enterprise network, generating a first logical mapping of each of a plurality virtual machine managers to hypervisors, the first logical mapping identifying hypervisors managed by virtual machine mangers, the identifying based on the virtual machine identifiers and the hypervisor identifiers, generating a second logical mapping of each of a plurality of hypervisors to virtual machines, the second logical mapping identifying the virtual machines managed by each of the plurality of hypervisors, the identifying based on the hypervisor identifiers and the virtual machine identifiers, generating a third logical mapping of one of the plurality of virtual machines to other virtual machines of the enterprise network, the identifying based on the plurality of virtual machine identifiers, receiving from at least one network probe: hypervisor traffic data, the hypervisor traffic data identifying communication between one of the plurality of hypervisors of the enterprise network and entities of a switch fabric of the enterprise network, entities of the switch fabric including switches, and virtual machine traffic data, the virtual machine traffic identifying communication between the one of the plurality of virtual machines of the enterprise network to entities of the switch fabric of the enterprise network, generating a fourth logical mapping of the plurality of hypervisors to the entities of the switch fabric of the enterprise network, the mapping based on the hypervisor traffic data, generating a fifth logical mapping one of the plurality of virtual machines of the enterprise network to the entities of the switch fabric of the enterprise network, the mapping based on the virtual machine traffic data, and outputting a master mapping, the master mapping based on the first logical mapping, the second logical mapping, the fourth logical mapping and the fifth logical mapping.

DETAILED DESCRIPTION

Figure 1:
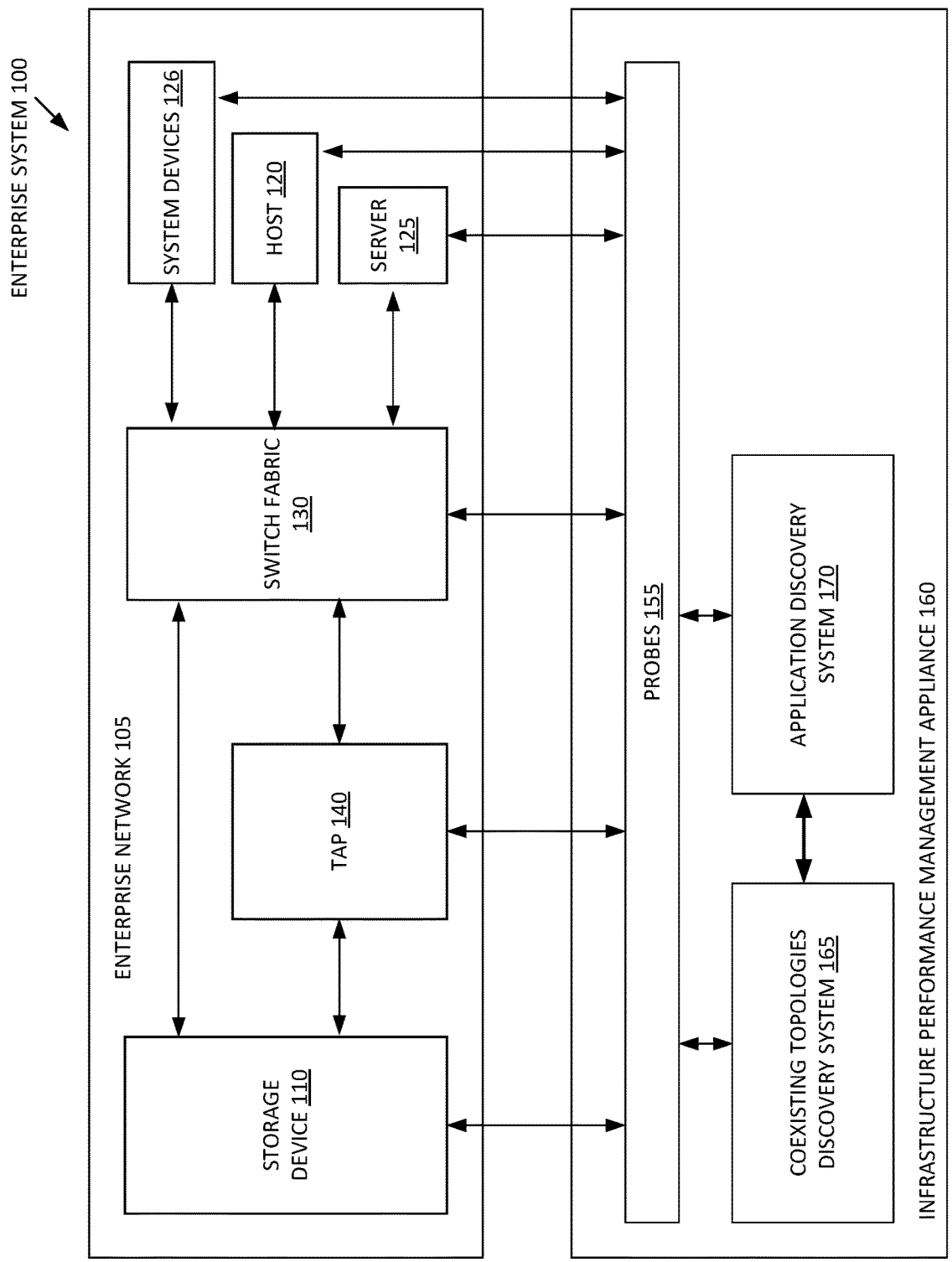
FIG. 1 depicts a block diagram of an enterprise system capable of discovering and traversing coexisting topologies according to some embodiments.

Various embodiments enables customers to deliver on complex requirements of their application infrastructure. Systems discussed herein may provide insights into the performance and availability of the end-to-end system—across physical, virtual and cloud environments. The system may intelligently capture, correlate, and/or analyze both breadth and depth of data, transforming data regarding an assets/applications of an enterprise network into answers and actionable insights.

A coexisting topologies discovery system may be used to add context to computational resource topologies and allow IT administrators to view and navigate through different topologies of an enterprise network. The coexisting topologies discovery system may receive data from different sources and identify, from the received data, entities of the enterprise network and relationships between the entities of the enterprise network. Data from different sources may identify different relationships between the same entities. By aggregating entities and the different types of relationship entities of the enterprise network may have in single topology, the IT administrator is able to add context to topologies and show the different ways entities of the enterprise network relate to each other.

The context or point of view of a user of the coexisting topologies discovery system may determine how two entities of the enterprise network, such as virtual machines (VMs) relate to each other. For example, when the question "What virtual machines are related to that virtual machine?" may be viewed from many different ways including: i) virtual machines on the same hypervisor as that virtual machine; ii) virtual machines on the same virtual manager as that virtual machine; and iii) virtual machines managed by the same switch as that virtual machine. The coexisting topologies discovery system may provide the answer to one or more of the above questions in a single place.

The coexisting topologies discovery system collects and analyzes network data from a variety of sources including, but not limited to: network traffic data, virtualization data, and/or application data. The coexisting topologies discovery system may parse the received network data into object data and relationship data. The object data may represent one network object of the enterprise network, while relationship data may identify entities of the enterprise network which are connected to network object(s) associated with an object entry.

An entity is a logical object of the enterprise network which may be monitored, and may include physical or cloud-based storage devices, physical or virtual computing devices, servers, fiber optical channel, routers, switches, and the like. A relationship is a direction connection between two entities. For example, a virtual machine manager (WM) may manage one or more hypervisors (and, therefore, have relationships with the hypervisor(s)). In some embodiments, the virtual machine manager may not have a relationship with any other network objects. Network objects includes physical and virtual objects of the network which communicate with each other by receiving, sending, and transmitting data.

There may be different ways that two or more entities of the enterprise network may be related to each other. For example, there may be any number of logical and/or physical methodologies a storage volume is connected a host. For example, one logical way to view a topology of a storage volume's connection to a host is to view a topology where the host is linked to the storage volume; the storage volume, in turn, is linked to the back end storage devices that actually stores the data. The ports of the storage device that a host is linked may be the physical topology to view how the storage volume is connected to the host.

It will be appreciated that the prior art does not collect network data as well as data from other sources to create and understand the relationships between entities and objects in the enterprise network.

Parsing network data from different sources may result in different object data and different relationship data. By parsing virtualization data from network data, the coexisting topologies discovery system may identify object data and relationship data associated with virtual entities of the enterprise network including virtual machine managers, hypervisors, or virtual machines. By parsing network traffic data from network data, the coexisting topologies discovery system may identify object data and relationship data associated with entities of the switch fabric such as routers and switches. By parsing application data, the coexisting topologies discovery system may identify application objects and relationship data associated with entities of an application of the enterprise network.

The virtualization data may aid in obtaining a virtualization topology and allows traversal of the virtualization topology of the enterprise network. The virtualization topology may represent relationships between virtual entities of the enterprise network 105. Virtual entities of the enterprise network 105 may include virtual machine managers hypervisors and virtual machines.

Regardless of the type of data being parsed by the coexisting topologies discovery system, the result of the parsing may be object entries and relationship entries associated with object data and relationship data respectively. Based on the multiple object entries and relationship entries, the coexisting topologies discovery system may build a master topology table that organizes the network objects of the enterprise network and the different kinds of relationships between two or more network objects of the enterprise network.

As the coexisting topologies discovery system receives network data from the various sources, one or more object entries and relationship entries may be updated.

The coexisting topologies discovery system may receive a query for a specific topology. The coexisting topologies discovery system may query topologies independently, and output the aggregated results, or the coexisting topologies discovery system may chain the topologies, query one topology, output the queried topology, use the outputted topology as a filter or starting point for subsequent topology. In some embodiments, the coexisting topologies discovery system may receive a query for a particular topology. In various embodiments, a mini-topology may be a subset of one or more particular topologies that are responsive to the query in an existing system. The coexisting topologies discovery system may receive queries to traverse out of one mini-topology and into another mini-topology while continuing to respect the directionality of previously defined topologies such as the particular topology.

FIG. 1 depicts a block diagram of an enterprise system 100 capable of discovering and traversing coexisting topologies. The enterprise system may include an enterprise network 105 and an infrastructure performance management appliance 160. The enterprise network 105 includes a storage device 110, a host 120, a server 125, system devices 126, a switch fabric 130, and a traffic access point (TAP) 140. The infrastructure performance management appliance 160 includes probes 155, a coexisting topologies discovery system 165 and an application discovery system 170.

The storage devices 110 of the enterprise system 100 include one or more storage system(s) that stores data. In one embodiment, the storage devices 110 includes a disk array. In some embodiments, a storage device includes a storage array network (SAN). In various embodiments, the storage device is cloud storage.

The host 120 of the enterprise system 100 may include physical computer or server which send or receive data, services or applications. Hosts may be also connected to other computers or servers via a network. In some examples, the host 120 may be an instance of an operating system. For example, the hosts 120 may include instances of UNIX, Red Hat, Linux and others. In some embodiments, the hosts 120 may include a physical computer managed by Microsoft Windows. Hosts 120 may include one or more virtual machines.

Server 125 may include computer software or hardware used to store manage network connections and store data. In some embodiments, the server 125 may be a physical computer or virtual machine which provides data to other computers.

System devices 126 may include entities of the enterprise network 105 such as third-party software platforms subscribed to by the enterprise network 105. In various embodiments, the third-party software platform includes IT management software such as ServiceNow or an application performance integration platform such as AppDynamics. ServiceNow or AppDynamics may provide an application to virtual machine mapping to the application-centrical infrastructure management system. The application to virtual machine mapping may aid the application-centric infrastructure management system in providing a real time application to host mapping.

The switch fabric 130 may use packet switching to receive, process, and forward data from a source device to a destination device. The switch fabric 130 may include any number of switches, such as routers, bridges, or the like. The switch fabric 130 may provide communication between any two entities of the enterprise system 100 such as the storage device 110, the host 120, the server 125, system devices 126, the switch fabric 130, and the TAP 140 and the infrastructure performance management appliance 160.

The TAP 140 may include an optical splitter which provides a copy of data passing through a fiber optic channel without affecting the integrity of the data. The fiber optic channel may connect the storage devices 110 to the server 125. The copy of data may be used for real-time performance monitoring of data traffic travelling through the fiber optic channel. The TAP 140 may provide connectivity to links between storage ports of the storage device 110 and switches of switch fabric 130. In various embodiments, the TAP 140 may provide connectivity on both sides of fabric-based storage virtualizers such as cloud-based storage.

In some embodiments, the probes 155 include network switch probes and/or software-based virtual machine probes.

The network switch probe may be an agentless software that utilizes one or more application programming interfaces (APIs) to gather switch performance and link error statistics from the switch fabric 130. The network switch probe may utilize Storage Management Initiative Specification (SMI-S) which is a standard intended to facilitate the management of storage devices from some SAN vendors. The network switch probe may discover and present to coexisting topologies discovery system 165 or the application discovery system 170, entities of the enterprise network 105 to aid in building a topology. A topology is a collection of relationships and entities and may be outputted to the user of the coexisting topologies discovery system. A hop describes a direct connection between two entities. A path is a set of ordered hops indicating the course from a start entity to an end entity. The entities of the enterprise network 105 may include physical fabric, logical fabric, physical switches, logical switches, blades and switch ports. In some embodiments, the probes 155 may receive application data from the application discovery system 170. In various embodiments, the probes 155 may receive virtual machine data from a virtualization platform.

The software-based virtual machine probes may be an agentless software that integrates software such as VMware vSphere to obtain vSphere metrics. The software-based virtual machine probes may obtain virtualization data for the coexisting topologies discovery system 165. The coexisting topologies discovery system 165 may parse the virtualization data into object data and relationship data. The virtualization data includes virtual machine manager identifiers, hypervisor identifiers, and virtual machine identifiers. The object data of the virtualization data may include these identifiers. In some embodiments, the coexisting topologies discovery system 165 may parse the virtualization data to obtain metric data. Metric data may include metrics or properties of the virtual machines such as virtual machine clone count, virtual machine power on count, and virtual machine power off count.

Each virtual machine manager identifier may identify a virtual machine manager of the enterprise network. As the name implies, the virtual machine manager manages one or more hypervisors of the enterprise network. The hypervisor identifier identifies a hypervisor of the enterprise network 105. The hypervisor is a software program that manages the operation of a virtualized environment, or virtual machines running on a physical host machine. The hypervisor enables creation, management, and governance of virtual machines. Each virtual machine identifier identifies a virtual machine of the enterprise network 105. As the name implies, a virtual machine is a computer file that behaves, for example, like a physical computer. The physical hardware running the virtual machine is referred to as a host, and the virtual machine executing on the host may be referred to as a guest. One host may execute more than one virtual machine, with each of the more than one guests emulating different operating systems (OS). The nature of virtual machines allows the IT administrator to multi-task any given physical computer host of the enterprise network, instead of utilizing multiple computing hardware devices each dedicated to a single computing task.

In some embodiments, the coexisting topologies discovery system 165 may receive network traffic data from a network traffic software platform such as NetFlow. In some embodiments, the coexisting topologies discovery system 165 sends a request to the probes 155 to receive network traffic data from the network switch probes. The network traffic data includes at least one of a source entity of the enterprise network, a destination entity of the enterprise network, and metrics of the network traffic. The metrics of the network traffic data includes at least one of a type of flow source, read speed total byte count, incoming byte count, outgoing byte count, incoming bit rate, outgoing bit rate, and total packet rate.

In some embodiments, the network traffic data may be in the form of flow packets. Each flow packet includes any number of flow records, a template record, and a packet header. Any number of flow records may provide information associated with each flow. In various embodiments, the data packet includes one or more template identifiers. Each of the flow records may be generated by one of any number of flow sources in a data path.

The coexisting topologies discovery system 165 may parse network traffic data into object data and relationship data. Object data represents an object of the enterprise network and may include an internet protocol (IP) address and attributes of the network object. In some embodiments, network objects of the enterprise network 105 include entities of the enterprise network 105, such as the host 120, an entity of the switch fabric, the storage device 110, and the server 125. In various embodiments, network object may represent an application instance of the enterprise network 105.

For example, the object data associated with an entity of the switch fabric 130, such as a switch may include the IP address of the switch, the manufacturer of the router, such as Cisco, and the version of the traffic monitoring software integrated into the switch. Relationship data associated with the switch may include a unique identifier associated with entities of the enterprise network 105 which has a directional connection to the switch. For example, a hypervisor may be connected to the switch, so the hypervisor has a directional connection with the switch. The relationship entry associated with the switch may include a unique identifier of the hypervisor and the type of network object of the enterprise network 105.

The coexisting topologies discovery system 165 may create or update an object entry based on discovered object data. A newly created or newly updated object entry may be updated to an object table. Each object entry includes attributes or properties of the network object. In some embodiments, the object entry may include an object unique identifier. For example, the unique identifier may be an internet protocol (IP) address.

The coexisting topologies discovery system may create or update a relationship entry based on the relationship data. A newly created or newly updated relationship entry may be updated to a relationship table. Each relationship entry includes attributes or properties of the relationship. For example, virtualization data associated with a hypervisor of the enterprise network may have object data which includes a hypervisor identifier and a unique identifier associated with the hypervisor. The unique identifier may be different from the hypervisor identifier. The coexisting topologies discovery system 165 may parse the virtualization data to obtain the relationship data. The relationship data includes a relationship identifier association with entities of the enterprise network 105 such as a virtual machine, that has a relationship with the hypervisor and the type of relationship that exists between hypervisor and the virtual machine. As the coexisting topologies discovery system receives network data from the various sources, one or more object entries and relationship entries may be updated.

In some embodiments, the relationship data represents different logical and/or physical relationships that two or more entities of the enterprise network are related. The relationship data may represent a communication protocol which two entities enterprise network may use to communicate with each other. For example, entities of the switch fabric may utilize one of a fiber channel protocol, ethernet protocol, or a customized communication protocol to communicate with each other. The IT administrator may want to visualize the enterprise network in terms of only one type of relationship or another. For example, if there is an issue with the speed of the fiber channel of the enterprise network, the IT administrator may want to determine the entities of the enterprise network which are connected together via the fiber channel. In this situation, the IT administrator may not be interested in determining the entities of the enterprise network which are connected together via an ethernet channel.

Different types of relationship that may exist between some entities of the enterprise network 105. The example table below may be utilized to determine a type of relationship for a field in the relationship data. Each object entry may be associated with more than one relationship entry.

TABLE 1

Types of entities and relationships parsed from virtualization data and network traffic data

| Type of Entity | Type of relationship | Relationship with which type of entity |
|---|---|---|
| Virtual Machine Manager | Manages | Hypervisor |
| Hypervisor | Hosts | Virtual Machine |
| Hypervisor | Connects to | Switch |
| Virtual Machine | Talks to | Virtual Machine |
| Virtual Machine | Managed by | Switch |

The coexisting topologies discovery system 165 may create or update a link entry based on the linking of one object entry with at least one relationship entry or linking two object entries together. The coexisting topologies discovery system 165 may compare the object identifier to the relationship identifier to determine if the object entry should be linked with the relationship entry. In some embodiments, the object identifier and the relationship identifier is an IP address associated with the entity of the enterprise network associated with the object entry and the relationship entry. In one embodiment, the object identifier may be a universal unique identifier. The link entry may be a part of a link table.

The coexisting topologies discovery system 165 may use the object entries, relationship entries, and link entries to build or update a topology table. The topology table may represent a master topology that may be built based on the network data received by the coexisting topologies discovery system 165.

In some embodiments, the coexisting topologies discovery system may receive a request to traverse coexisting topologies of the enterprise network. In some embodiments, the coexisting topology is a master topology or a subset of the master topology. The master topology may comprise object entries from all entities of the enterprise system. A mini-topology may be a subset of the master topology. In various embodiments, the mini-topology is a collection of multiple relationships and multiple entities of the enterprise system. A user of the coexisting topologies discovery system 165 may traverse from one mini-topology into another mini-topology, while at the same time keeping the directionality of the mini-topologies involved. Alternately, a user of the coexisting topologies discovery system 165 may traverse from one mini-topology into another topology, while at the same time keeping the directionality of the topologies involved.

In some embodiments, the coexisting topologies discovery system 165 may receive network traffic data from a network traffic software platform such as NetFlow.

In some embodiments, the coexisting topologies discovery system 165 may receive the list of applications from the application discovery system 170. The process of application discovery may include the application discovery system 170 implementing secure shell (SSH), or windows management instrumentation (WMI) to communicate with entities of the enterprise network 105. The application discovery system may take information received from SSH and WMI protocols and apply heuristics to suggest from heuristic implications what applications could exist. For example, the application discovery system 170 may determine that entities of the enterprise network 105 which communication with each other at regular intervals throughout the day and were introduced to the enterprise network 105 at around the same time may be a part of the same application.

In some embodiments, the process of application discovery includes integrating information from software platforms that manages and/or monitors performance of applications on the enterprise network 105. For example, the application discovery system 170 may take information regarding applications discovered by ServiceNow along with information from SSH or WMI to obtain a more accurate topology of entities involved in applications of the enterprise network 105. The enterprise may choose to subscribe to software platforms such as ServiceNow and AppDynamics to monitor entities of the enterprise network 105 known to be associated with business-critical applications.

In some embodiments, the application discovery system 170 identifies entities of an enterprise network, integrates data from software platforms already subscribed by the enterprise network 105, and retrieves data from probes to monitor various entities of the enterprise network. In some embodiments, the probes are hardware probes, software probes, or a combination of the two. In various embodiments, the probes are plug-ins that come built in with various network monitoring platforms. In some embodiments, a probe may include an optical splitter which provides a copy of data passing through a fiber optic channel of the enterprise network 105 without affecting the integrity of the data. The fiber optic channel connecting storage devices with servers of the enterprise network. The copy may be used for real time performance monitoring of the traffic travelling through the fiber optic channel. The information obtained from the probes may suggest from heuristic implications that applications could exist on the enterprise network 105.

It may be appreciated that platforms such as ServiceNow and AppDynamics may not be able to discover applications running on entities of the enterprise network 105 which are not monitored by those platforms. Furthermore, ServiceNow, AppDynamics and the like may not be able to recognize an entity added to an application subsequent to the discovery of the application by ServiceNow, unless the enterprise subscribes the added entity of the enterprise network 105. In addition, ServiceNow may not be able to recognize applications running on entities not subscribed to ServiceNow which has an effect on a business-critical application. For example, a host of enterprise network 105 which is not subscribed to ServiceNow may be in communication with a server that is part of a business-critical application, such as web server. The host may be running an out-of-date version of a long forgotten application and is in constant communication with the server of web server and taking up the utilization of an entity of a business critical application. The use of application discovery on entities of the enterprise network 105, regardless of whether or not the entity is subscribed to ServiceNow, AppDynamics or other software platforms which manages or monitors the performance of applications on the enterprise network 105, may aid in discovering inefficient software and hardware components of the enterprise network 105 and obtain a better understanding of where applications live on the infrastructure of the network and model and monitor application behavior and their effect on infrastructure resources.

In some embodiments, the application discovery system 170 may update or modify a set of applications discovered by the IT management or application performance software platforms. For example, ServiceNow may determine that an email service of the enterprise includes eight entities communicating with each other in a particular configuration. The application discovery system 170 may create and store a discovered application entry which includes attributes (e.g., metrics) of the discovered application such as a suggested name of the discovered application as well as attributes associated with the eight entities which make up the discovered application. Through SSH or WMI commands on the entities of the enterprise network 105, heuristic implications of the application discovery system 170 may suggest or otherwise indicate that the enterprise network 105 includes an email service comprising nine entities with eight of the nine entities communications in the same configuration as the configuration from the email service discovered by ServiceNow. The ninth entity may not be subscribed to by ServiceNow, or the ninth entity may have been added to the enterprise network 105 after the IT management or application performance software platform was introduced to the enterprise network 105. In some embodiments, the application discovery system 170 may create a discovered application entry which includes attributes associated with the nine entities which make up the discovered application and over write the previous discovered application entry of the email service with eight entities in the datastore of the application discovery system 170.

In various embodiments, the application discovery system 170 does not overwrite the second discovered application entry for the email service with nine entities, but reports both discovered application entries, and have a system or network professional decide which discovered application entry is correct, or the one to keep. In some instances, the application discovery system 170 may send a request to ServiceNow to update the attributes associated with the application as well as the entities associated with the application.

The process of discovering applications can be time consuming and take up enterprise network resources and cause users on the enterprise network to experience slow response time. For example, if enterprise network 105 comprised 100,000 entities, the SSH or WMI component of the application discovery process may involve the SSH or WMI command between the application discovery system 170 and the 100,000 entities. It is advantageous to schedule application discovery to a time frame when the servers and other entities of the enterprise network are not experiencing a high level of utilization or when critical functions are not impacted (or impacted marginally).

In one example, an IT administrator may schedule an application discovery process to take place during particular times of the day or week. The application discovery process may be paused. The application discovery system 170 may bookmark the last discovered application or the last piece of data received from SSH or WMI command. When the application discovery process resumes, the application discovery system 170 may resume the process at the bookmarked state. In another example, the application discovery system 170 may determine that an application discovery process can commence on an entity of the enterprise network, such as a server, if an entity utilization less than an entity utilization threshold.

The application discovery system 170 may determine that the application discovery process of an entity of the enterprise network 105 is suspended when the entity utilization is greater than the entity utilization threshold. In some embodiments, the entity utilization threshold which triggers the commencement of the application discovery process and the entity utilization threshold which triggers the suspension of the application discovery process are different.

In some embodiments, the application discovery process is complete, or is suspended when one of a plurality of trigger conditions is satisfied. Trigger conditions may include a scheduled discovery period has passed, the application discovery system 170 receives input from the user of the enterprise network 105 to commence or suspend the application discovery process, or the utilization threshold of one or more entities of the enterprise network 105 is reached.

The application discovery system 170 may receive information from a subset or all of the entities of the enterprise network for a predetermined period of time. The predetermined period of time may be determined by a user of the enterprise network 105 such as the IT administrator or authorized device of the enterprise network 105. The IT administrator or authorized device of the enterprise network 105 may schedule the application discovery process and determine the start, end and duration of the application discovery process. In various embodiments, the subset of the entities of the enterprise network is determined by the IT administrator, authorized device of the enterprise network 105, or by the application discovery system 170.

The application discovery system 170 may receive input from the user of the enterprise network 105 to commence or suspend the application discovery process. In some embodiments, the application discovery system 170 discover applications on the enterprise network 105. The IT administrator of the enterprise network 105 may schedule an application discovery process to occur during specified times of the day and/or during particular days of the week. The application discovery system 170 may receive a request for an initial application discovery of the enterprise network 105. This request may occur after the application discovery system 170 is first installed into the enterprise network 105 and may occur on command and/or at specified times/dates.

Once initiated, the initial application discovery process may continue until it is completed or paused. The application discovery system 170 may run subsequent analysis according to the schedule inputted by the IT administrator or authorized device of the enterprise network 105. Application discovery processes subsequent to the initial application discovery may involve the same steps, however, an initial application discovery process may require more time to complete since subsequent application discovery process may ignore applications which have been previously discovered.

In some embodiments, the application discovery system 170 discovers that a particular application has not changed in the last predetermined number of iterations (e.g., ten) of the application discovery process. In such a case, the application discovery system 170 may choose to identify the application periodically. As such, the application discovery system 170 may skip analysis or determination of previously discovered applications that rarely change.

In various embodiments, the number of iterations which triggers the periodic discovery of an application, such as ten in the above example, may change according to attributes (e.g., metrics) of the particular application, such as tier or criticality of the particular application. For example, a more critical application may require discovery or identification during every iteration of the application discovery process, to ensure that entities associated with the critical application are monitored, while a less critical application may not require discovery during every iteration of the application discovery process.

In one embodiment, once initiated, the application discovery system 170 may suspend the initial application discovery process when a scheduled application discovery time frame has elapsed. The application discovery process may be suspended until a subsequent scheduled application discovery time frame has begun. In some embodiments, the initial application discovery process is suspended when the entity utilization of one or more (e.g., a predetermined number of) entities of the enterprise network is greater than an entity utilization threshold. In various embodiments, the initial discovery process is suspended when the application discovery system 170 receives an input from the IT administrator or authorized device of the enterprise network 105 to suspend the application discovery process.

Figure 2:
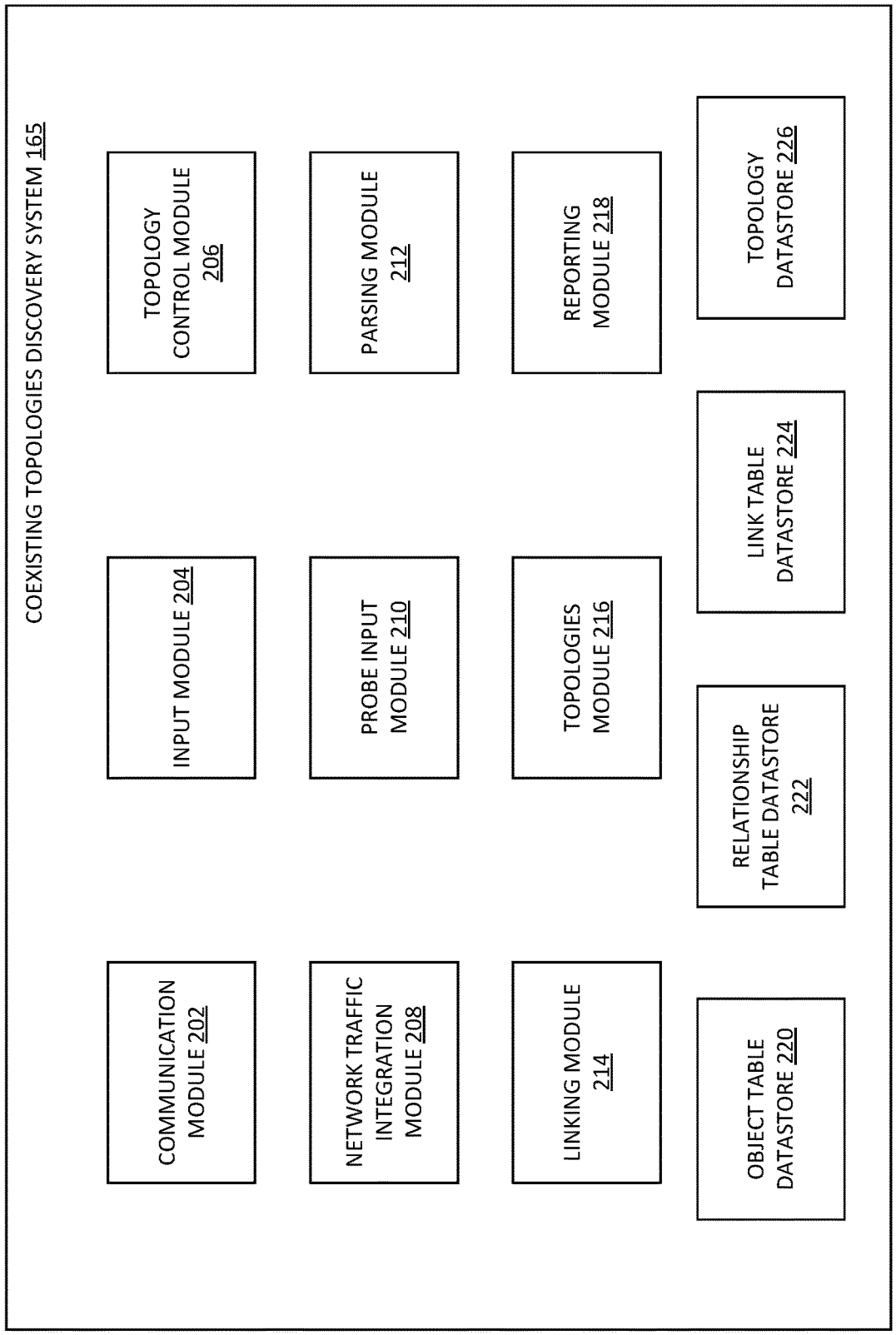
FIG. 2 depicts a block diagram of an example of a coexisting topologies discovery system according to some embodiments.

FIG. 2 depicts a block diagram of an example of a coexisting topologies discovery system 165 according to some embodiments. The coexisting topologies discovery system 165 includes a communication module 202, an input module 204, a topology control module 206, a network traffic integration module 208, a probe input module 210, a parsing module 212, a linking module 214, a topologies module 216, a reporting module 218, an object table datastore 220, a relationship table datastore 222, a link table datastore 224, and a topology datastore 226.

The communication module 202 may send and receive requests or data between any of the coexisting topologies discovery system 165, the application discovery system 170, the probes 155 and any of the entities of the enterprise network 105.

The communication module 202 may send a request to the probes 155 for network data (or receive network data from the probes 155 without the request). For example, the communication module 202 may facilitate a request from the topology control module 206 to the probes 155 for network traffic data, virtualization data, and/or application data from the network switch probes, the virtualization software platform, and the application discovery system 170 respectively. In various embodiments, the communication module 202 may facilitate a request from probe input module 210 to receive network data from a flow source discovery system (not shown).

The communication module 202 may send the requested network traffic data to the parsing module 212. The communication module 202 may receive the request from the topology control module 206 and in response, send the request to the parsing module 212 to parse the received network traffic data into object data and relationship data.

The communication module 202 may facilitate communication between modules and outside the coexisting topologies discovery system 165. The communication module 202 may send the requested virtualization data to the parsing module 212. The communication module 202 may receive the request from the topology control module 206 and in response send the request to the parsing module 212 to received virtualization data into object data and relationship data.

The communication module 202 may send the requested application data to the parsing module 212. The communication module 202 may receive the request from the topology control module 206 and in response send the request to the parsing module 212 to received application data into object data and relationship data.

The communication module 202 may send a request to the object table datastore 220 to create or update an object entry of the object entry table. The communication module 202 may send a request to the relationship table datastore 222 to create or update a relationship entry of the relationship entry table. The communication module 202 may send a request to the link table datastore 224 to create or update a link entry of the link entry table. As the coexisting topologies discovery system receives network data from the various sources, one or more object entries and relationship entries may be updated.

Network data may be received from different sources. The object entries and relationship entries parsed from the network data may be used to build or update the master topology. Depending on the source of the received network data, the master topology may be able to output a topology with different context.

For example, if the coexisting topologies discovery system 165 receives virtualization data from the virtualization software platform, the master topology may comprise object entries associated with virtual machine managers, hypervisors, and virtual machines. The master topology may also comprise the different types of relationships between the object entries.

While some types of relationships are shown in Table 1, the master topology built by the topologies module 216 may not be able to show a hypervisor-switch relationship, since the parsing module 212 may not receive network data which identifies a switch object or a relationship between the hypervisor and the switch. Similarly, the master topology may not be able to show a virtual machine-switch relationship, since the parsing module 212 may not receive network traffic data that identifies a switch object or a relationship between the virtual machine and a switch.

If the coexisting topologies discovery system 165 receives network traffic data from the network traffic software platform, as well as the virtualization data from the virtualization software platform, the parsing module 212 may be able to identify the switch object and a relationship between one hypervisor and one or more switches. The master topology built by the topology module 216 may also be able to identify a relationship between a hypervisor and a switch or a relationship between a virtual machine and a switch. The topologies may send a request to the topology datastore 226 to create a table entry for the master topology.

The communication module 202 may receive a request to send the list of applications from the IT administrator or another user of the enterprise network. The list of applications may include information regarding applications of the enterprise network 105 as well as attributes of applications. The list of applications may include entities of the enterprise network 105 which make up each of any number of applications and attributes of each of any number of entities. In some embodiments, the list of applications further includes a tier of service associated with each application of the enterprise network 105. In some embodiments, the communication module 202 may receive the list of applications via the input module 204. The communication module 202 may send the list of applications to the parsing module 212 to parse the received application data.

The communication module 202 may receive from the IT administrator or other user of the enterprise network 105, a query for a specific topology. In some embodiments, the communication module 202 may receive the query via the input module 204. The communication module 202 may send the query to the topologies module 216.

The input module 204 may receive a list of applications from the IT administrator or other user of the enterprise network 105. The input module 204 may receive a list of some or all or some of the entities of the enterprise network 105, as well as attributes associated with entities of the enterprise network 105 such as a network tier associated with the entity, name of the entity or type of entity. Some or all of the applications listed in the list of application may be parsed into object data by the parsing module 212. Some or all of the entities of the enterprise network 105 may be parsed into object data by the parsing module 212. In some embodiments, the input module 204 may receive the list of applications from the application discovery system 170.

In some embodiments, the input module 204 may receive application data from the application discovery system 170. The application data may include application identifiers and/or attributes of the application. The input module 204 may send the received application data to the parsing module 212.

The input module 204 may receive virtual machine data from any number of virtual machine data probes integrated within the enterprise network 105. In some embodiments, any number of virtual machine data probes may be a part of software integrated in a product suite such as VMware vSphere. The virtual machine data may indicate application instances of the enterprise network 105 running on the virtual machine associated with the virtual machine data. In various embodiments, the virtual machine data includes virtual machine identifiers, the virtual machine identifiers identifying a virtual machine of the enterprise network 105 executing at least one application instances.

The virtual machine data may provide to the coexisting topologies discovery system 165 a real-time virtual machine to host mapping of the enterprise network 105. The topology control module 206 may send this information to the parsing module 212 to update or create an object entry, a relationship entry, and/or a link entry. The parsing module 212 may parse the virtualization data (e.g., using a template) to identify object data and relationship data. The parsing module 212 may send a request to the object table datastore 220 to create object entries for virtual machines and hosts.

In one embodiment, the relationship table datastore 222 may receive a request to create or update relationship entries based on the mapping of the virtual machine object to the host entry which hosts the virtual machine. The virtualization data may aid in obtaining a virtualization topology and allow traversal of the virtualization topology of the enterprise network. The virtualization topology may represent relationships between virtual entities of the enterprise network 105. Virtual entities of the enterprise network 105 may include virtual machine managers hypervisors and virtual machines.

For example, the parsing module 212 may receive application data that maps an email application to entities of the enterprise network may include virtual machines and hosts. The parsing module 212 may parse the application data to identify object data and relationship data. The parsing module 212 may send a request to the object table datastore 220 to create object entries of the email application, email application instances which make up the email application, and entities of the enterprise network 105 which make up each email application instance. In one embodiment, the relationship table datastore 222 may receive a request to create or update relationship entries which links email application object entry to one or more email application instance objects. The relationship table datastore 222 may receive a request to create or update relationship entries which links object entries which represent each entity of the enterprise network which make up the email application instance to the email application instance object entry.

Figure 4A:
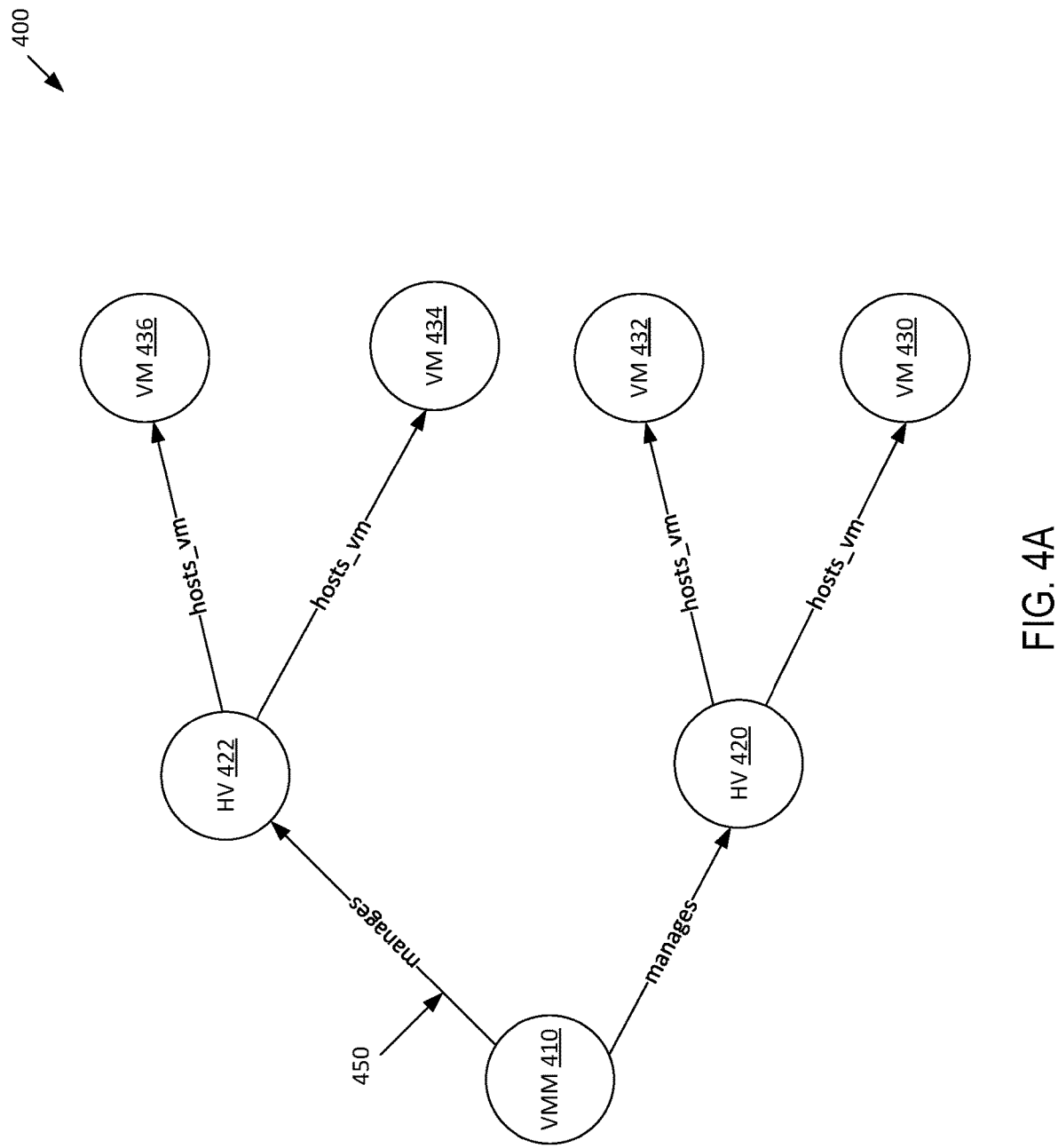
FIG. 4A depicts an example logical virtualization topology according to some embodiments.
Figure 4B:
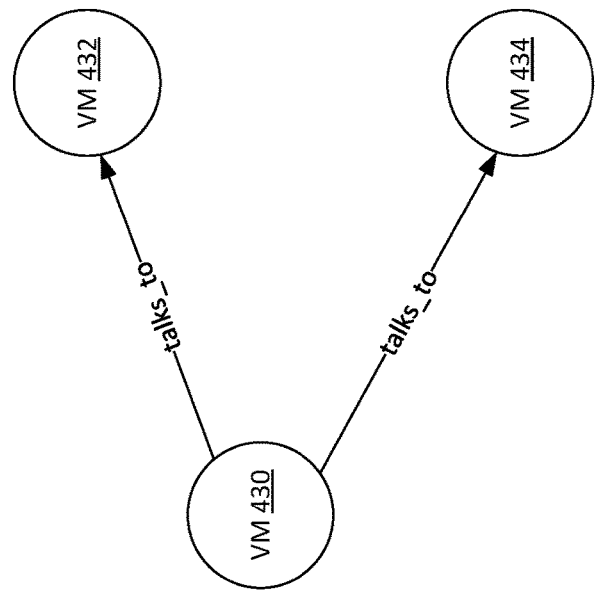
FIG. 4B depicts an example logical application topology according to some embodiments.

The input module 204 may receive from the IT administrator or other user of the enterprise network 105, a list of object data or a list of relationship data. The list of object data may include entities of the enterprise network 105 known to the IT administrator. Each entry in the list of object data may include a name of the entity of the enterprise network and an object unique identifier. The list of relationship data may include relationships between two or more entities of the enterprise network 105 known to the IT administrator. Each entry in the list of relationship data may include the names or object unique identifiers associated with the entities involved in the relationship and the type of relationship. For example, one entry of the list of relationship data may include an IP address of two virtual machine which are related to each other in some way. The type of relationship in this case is one virtual machine talks with the other virtual machine. An example logical application topology 402 of FIG. 4B depicts that a virtual machine (VM) 430 communicates with or talks to a virtual machine 434 and a virtual machine 432.

The input module 204 may receive the query for the specific topology from the IT administrator or other user of the enterprise network 105. The input module 204 send the query for the specific topology to the topology control module 206.

The topology control module 206 may receive network data from the probes 155. The network data includes network traffic data from the network switch probes, virtualization data from the virtualization software platform, or application data from the application discovery system 170.

The network traffic data may include at least one of: a source entity of the enterprise network, a destination entity of the enterprise network, and metrics of the network traffic. The metrics of the network traffic data may include at least one of a type of flow source, read speed total byte count, incoming byte count, outgoing byte count, incoming bit rate, outgoing bit rate, and total packet rate. The 206 may send a request to the parsing module 212 to parse the network traffic data.

In some embodiments, the network data includes virtualization data. The topology control module 206 may send a request for virtualization data to the virtualization software platform. The virtualization software platform may receive the request from the topology control module 206 and send a request to the parsing module 212 to parse the virtualization data into object data and relationship data.

The topology control module 206 may receive a request from the parsing module 212 to create or update an object entry based on the parsing of the received virtualization data. The topology control module 206 may send a request to create or update the object entry to the object table datastore 220. In some embodiments, the parsing module 212 may send the request to create or update the object entry directly to the object table datastore 220.

The topology control module 206 may receive a request from the parsing module 212 to create or update a relationship entry based on the parsing of the received virtualization data. The topology control module 206 may send a request to create or update the relationship entry to the relationship table datastore 222. In some embodiments, the parsing module 212 may send the request to create or update the relationship entry directly to the relationship table datastore 222.

In some embodiments, the network data includes application data. The topology control module 206 may receive application data from the application discovery system 170. The application data may include application identifiers, a tier of service, and a mapping of entities of the enterprise network 105 to the application. Each application identifier may identify one application instance of the enterprise network 105. Entities of the enterprise network 105 associated with an application may be assigned the tier of service of that particular application instance. The topology control module 206 may send this information to update or create one or more of an object entry, a metric entry, and/or a link entry to the parsing module 212.

For example, the topology control module 206 may receive a request from the parsing module 212 to create an object entry based on an application instance of a virtual desktop infrastructure (VDI) application. The topology control module 206 may also receive a request from the parsing module 212 to create an object entry for each entity of the enterprise network 105 which make up the VDI application. The topology control module 206 may receive a request to create link entries which links object entries which represent each of the entities which make up the VDI application to an object entry associated with entities of the enterprise network 105 which make up the VDI application. Assuming that two virtual machines make up the VDI application and that the two virtual machines communication with each other, the topology control module 206 may receive a request to create a relationship entry for the two virtual machines which make up the VDI application.

The topology control module 206 may receive the query for the specific topology. The topology control module 206 may send the query to the topologies module 216. Once the topologies module 216 identifies the object entries and relationship entries which make up the queried topology, the topologies module 216 may send a request to the topology control module 206 to output the queried topology. The topology control module 206 may receive the request from the topologies module 216 and in response, send a request to the reporting module 218 to output the queried topology. In some embodiments, the topologies module 216 may send the request to output the queried topology directly to the reporting module 218. In various embodiments, the topology control module may receive the query for a particular standard topology. In one example, a mini-topology may be a subset of one or more particular topologies that are responsive to the query of an existing system. The coexisting topologies discovery system may receive queries to traverse out of one mini-topology and into topology while continuing to respect the directionality of previously defined topologies such as the particular standard topology. Alternately, a user of the coexisting topologies discovery system 165 may traverse from one mini-topology into another topology, while at the same time keeping the directionality of the topologies involved.

The network traffic integration module 208 may receive network traffic data from the network traffic software platform, such as NetFlow. In some embodiments, the network traffic integration module 208 may receive network traffic data directly from the network traffic software platform.

Network traffic software platforms such as NetFlow logs flow records which, in some embodiments, is a summary of the interaction between two IP addresses. The network traffic integration module 208 may retrieve flow records between IP addresses of the enterprise network 105 from switches enabled with network traffic software, such as NetFlow. These flow records may be analyzed by the topology control module 206 to determine possible applications and possible network endpoints.

In some embodiments, the network traffic integration module 208 retrieve flow records from NetFlow during scheduled retrieval periods. The scheduled retrieval may be accomplished by a scheduling module. The network traffic integration module 208 may retrieve, from the input module 204, flow records from a specific IP address. In some embodiments, these specific IP addresses may represent flow source important to the operations of the enterprise network 105.

The probe input module 210 may receive network traffic data from the network switch probes. In some embodiments, the network traffic data may be in the form of flow packets. Each flow packet may include any number of flow records, a template record, and a packet header. Any number of flow records may provide information associated with each flow. In various embodiments, the data packet includes one or more template identifiers. Each of the flow records may be generated by one of any number of flow sources in a data path.

A template record may be used to recognize a format of the subsequent flow records that may be received in the current or future data packets. For example, there may be different formats (e.g., and therefore different template records to recognize the different formats) for sFlow data packets, Jflow data packets, and Cflow data packets. In various embodiments, different versions of the same type of data packet may have different templates. For example, there are multiple versions of Cisco's NetFlow software platform, and each version may have a different template record because data from different versions of the platform may have different formats. In some embodiments, the coexisting topologies discovery system 165 may need to match the template record of an incoming data packet with a template record stored in the coexisting topologies discovery system 165 before the incoming network can be parsed. In various embodiments, the template record includes or identifies a template.

A packet header may include information regarding the packet, such as the version of the network traffic analyzing software platform associated with the data packet, the number of flow records contained within the data packet, and a sequence number. The sequence number may aid in detecting lost data packets.

A template identifier (ID) may be a number which may distinguish one template record from other template records produced by the same export device. A flow collector may receive export packets from different switching hardware devices, and the uniqueness of template records may not be guaranteed across different switching hardware devices. In some embodiments, the flow collect may store the IP address of the switching hardware device that produced the template ID in order to assist in the enforcement of uniqueness. The parsing module 212 may utilize the template identifier to parse the network traffic data.

The probe input module 210 may receive virtualization data from the virtualization software platform. The virtualization data may include virtual machine manager identifiers, hypervisor identifiers, and virtual machine identifiers.

The probe input module 210 may receive application data from the application discovery system 170. The application data may include attributes of the application such as a tier of service of the application, a name of the application, and entities of the enterprise network which make up the application. In some embodiments, the application data includes application metrics such as application read response time and application write response time.

In various embodiments, the probe input module 210 may receive from the third-party virtualization platform, virtual machine data may provide to the coexisting topologies discovery system 165 a real-time application to host mapping of the enterprise network 105. The coexisting topologies discovery system 165 may send this information to update or create one or more of an object entry, a metric entry or a link entry to the parsing module 212.

The parsing module 212 may parse the received network data to identify object data and relationship data. The received network data may include network traffic data and virtualization data. In some embodiments, the received network data may include application data received from the application discovery system 170.

The parsing module 212 may receive network traffic data received from the network switch probes. The parsing module 212 may parse the received network traffic data to identify object data and relationship data. Object data parsed from the network traffic data includes entities of the enterprise network 105 such as hosts, routers, switches, storage devices, and servers. Relationship data parsed from the network traffic data may include entities of the network which are connected to each other or communicate with each other.

The network traffic data may aid in obtaining a physical topology and allows traversal of the physical topology of the enterprise network 105. The physical topology may represent relationships between physical connectivity between virtual and physical entities of the enterprise network 105. Virtual entities of the enterprise network 105 may include hypervisors and virtual machines. Physical entities of the enterprise network 105 may include entities of the switch fabric 130 such as switches and routers.

The parsing module 212 may receive the virtualization data received by the probe input module 210 and parse the received virtualization data to identify object data and relationship data. Object data may be identified based on a universal unique identifier (UUID). In some embodiments, the parsing module 212 may identify relationship data by reviewing the virtualization data to identify if the source port and destination port of IP data traffic matches that of virtual serial ports of two virtual computing devices such as a virtual machine manager, a hypervisor or a virtual machine.

In some embodiments, the virtual computing devices may be identified based on the universal unique identifier. In various embodiments, the virtual computer devices may be identified using an IP address. Once the virtual computing devices involved in the IP data traffic has been identified, the parsing module 212 may determine the type of relationship that exist between the two virtual computing devices. For example, referring to Table 1, if the parsing module determines that the source serial port is a virtual machine manager and the destination serial port is a hypervisor, then the relationship between the virtual machine manager and the hypervisor is the virtual machine manager manages the hypervisor.

The virtualization data may aid in obtaining a virtualization topology and allows traversal of the virtualization topology of the enterprise network. The virtualization topology may represent relationships between virtual entities of the enterprise network 105. Virtual entities of the enterprise network 105 may include virtual machine managers hypervisors and virtual machines.

The parsing module 212 may parse the application data to identify object data and relationship data. Object entries may be created for each application instance, and entities of the enterprise network which make up the application instance. The object entry may also include attributes of the application. In one embodiment, relationship data parsed from the application data may include the relationship between two or more object entries, such as linking an object entry associated with an application instance to another object entry associated with an entity of the enterprise network which make up the application instance.

The application data may aid in obtaining an application infrastructure topology and allows traversal of the application infrastructure topology of the enterprise network. The application infrastructure topology may represent relationships between entities of the enterprise network 105 which make up a particular application or application instance.

The linking module 214 may send a request to the link table datastore 224 to create or update a link entry. The link entry may link an object entry with a relationship entry. An object entry may be linked with one or more relationship entries. In some embodiments, the link entry may link two object entries together or one relationship entry with one object entry.

For example, referring to the example logical application topology 402 of FIG. 4. The probe input module 210 may receive virtualization data from the virtualization software platform. The probe input module 210 may send the received virtualization data to the parsing module 212. The parsing module 212 may receive the virtualization data from the probe input module 210 and identify object data associated with virtual machines 430, 432, and 434.

In this example, the parsing module 212 may send a request to the object table datastore 220 to create three object entries, one for each of the three identified virtual machines. The parsing module 212 may identify relationship data such as IP network traffic between virtual machine 432 and 430 and IP network traffic data between virtual machines 434 and 430. The relationship data may also include the type of relationship that exists between the source entity and destination entity of the IP network traffic. The parsing module 212 may send a request to the relationship table datastore 222 to create relationship entries representing the virtual machine 430 talking to the virtual machine 432 and the virtual machine 430 talking to virtual machine 434. The linking module 214 may create one link entry which links the object entry associated with virtual machine 430 with the relationship entry associated with the IP network traffic between virtual machine 430 and virtual machine 432. The linking module 214 may create another link entry which links the object entry associated with virtual machine 430 with the relationship entry associated with the IP network traffic between virtual machine 430 and virtual machine 434. In some embodiments, the parsing module 212 may parse the received virtualization data and identify metric data. As new virtualization data is received by the probe input module 210 from the virtualization software platform, one or more of the object entries and/or link entries may be created or updated.

The topologies module 216 may receive the query for the specific topology from the input module 204. The query may include a unique identifier identifying a particular entity of the enterprise network 105. More than one topology may be requested when traversing a topology. Multiple topologies may be combined in a number of ways: i) topologies may be queried independently, the independently queried topology are aggregate and the aggregated topology be outputted; and ii) chain the topologies by querying one topology, output the queried topology and use the outputted topology as a filter or starting point for subsequent topologies.

For example, the reporting module 218 may output a query input interface. The IT administrator may interact with the query input interface, in response to the interaction, the input module 204 may receive a query for a topology. The different types of topologies that may be available for searching depends on type of network data received by the probes 155. The different types of topologies may visualize the relationship between entities of the enterprise network 105 in a logical way or in a physical way. Some example topologies that are available include: a logical virtualization topology, a logical application communication topology, a physical layer 1 topology and a SNMP managing/monitoring topology.

The logical virtualization topology may be modelled to output a logical relationship for virtual machine software. The logical virtualization topology may be obtained with virtualization data received from a third-party virtualization platform. The logical virtualization topology may output the relationship between virtual entities of the enterprise network 105. An example logical virtualization topology 400 of FIG. 4A shows the relationship between a virtual machine manager 410, hypervisors 420 and 422, and virtual machines 430, 432, 434, and 436. The arrows between the virtual entities shown in the example logical virtualization topology depicts the types of relationship directional relationship between the virtual entities on both sides of the arrow. The relationship between the two virtual entities on either side of the arrow is a directional relationship, meaning that it is a one-way relationship. For example, the text embedded in an arrow 450, placed between the virtual machine manager 410 and the hypervisor 422 depicts that the virtual machine manager 410 manages the hypervisor 422 and not vice versa. Each virtual entity shown in the example logical virtualization topology 400 may be represented in the object table datastore 220 in an object entry. Each relationship depicted in the example logical virtualization topology 400 may be represented in the relationship table datastore 222 in a relationship entry.

The logical application communication topology may be modelled to output a logical application relation for virtual machines. The logical application communication topology may be obtained with virtualization data received from a third-party virtualization platform. The logical application communication topology may output the relationship between virtual machines of the enterprise network 105. An example logical application topology 402 of FIG. 4B shows the relationship between virtual machines 430, 432 and 434. The relationship depicted in the logical application topology 402 depicts virtual machines which talk or communicate with each other. In the example logical virtualization topology 400 of FIG. 4A the relationship which involves the virtual machines 430, 432, and 434 represent virtual machines which share the same hypervisor and does not depict virtual machines which communicate with each other. Each relationship depicted in the example logical application topology 402 may be represented in the relationship table datastore 222 in a relationship entry.

Figure 4C:
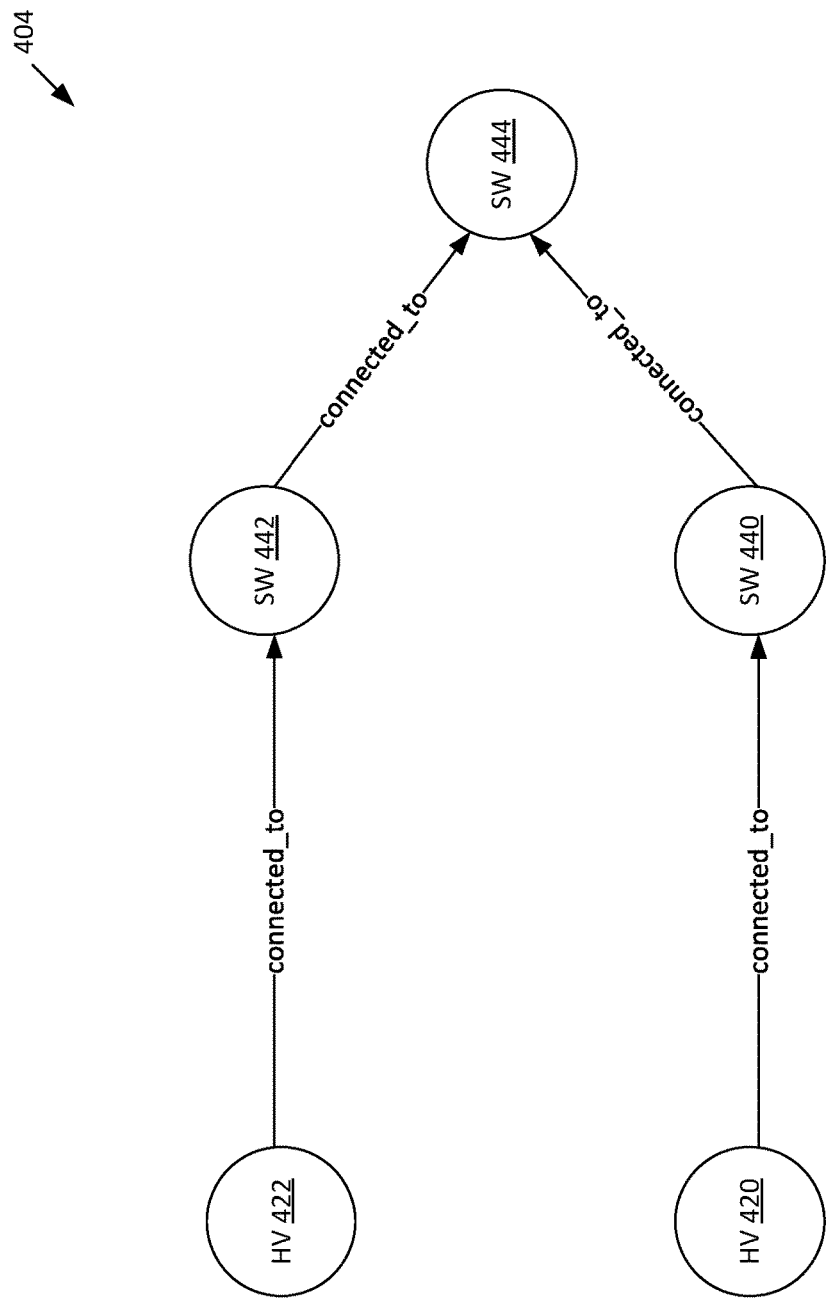
FIG. 4C depicts an example physical layer 1 topology according to some embodiments.

The physical layer 1 topology may be modelled to output the physical connectivity between hypervisors and physical switches. The physical layer 1 topology may be obtained with network traffic data received from a network traffic software platform. The physical layer 1 topology may output the physical switches that each hypervisor uses to connect to the network. An example physical layer 1 topology 404 of FIG. 4C shows the relationship between hypervisors 420 and 422 and switches 440, 442, and 444. The relationship depicted in the logical application topology 402 depicts virtual machines which talk or communicate with each other. In the example physical layer 1 topology 404 of FIG. 4C the relationship which involves the hypervisors 420 and 422 and switches 440 and 442 represent entities of the enterprise network, virtual and physical, which share the same switch. Each relationship depicted in the example physical layer 1 topology 404 may be represented in the relationship table datastore 222 in a relationship entry. In the example logical virtualization topology 400 of FIG. 4A the relationship which involves the hypervisors 420 and 422 represent virtual machines which share the same hypervisor and does not depict the physical switches which are connected to the hypervisors.

The parsing of the network traffic data may aid in obtaining a physical topology and allows traversal of the physical topology of the enterprise network 105. The physical topology may represent relationships between physical connectivity between virtual and physical entities of the enterprise network 105. Virtual entities of the enterprise network 105 may include hypervisors and virtual machines. Physical entities of the enterprise network 105 may include entities of the switch fabric 130 such as switches and routers.

Figure 4D:
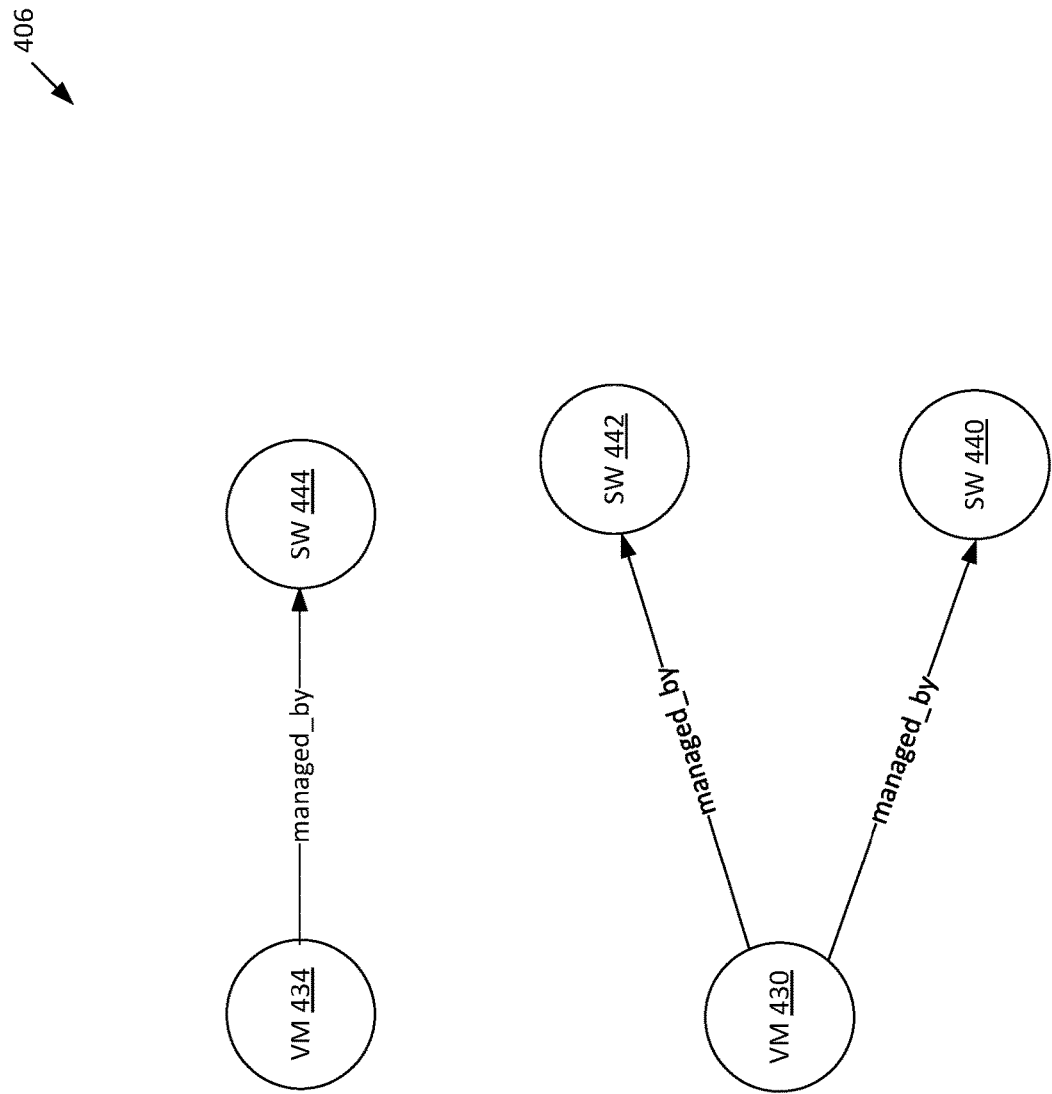
FIG. 4D depicts an example protocol managing topology according to some embodiments.

The SNMP managing/monitoring topology an example protocol managing topology 406 may be modelled to show the virtual machines which manages physical switches by some management or monitoring protocol such as SNMP. The protocol managing topology may output the physical switches that each virtual machine uses to connect to the network. An example protocol managing topology 406 of FIG. 4D shows the relationship between the virtual machines 430 and 434 and the physical switches 440, 442, and 444. The relationship depicted in the example logical application topology 402 of FIG. 4B depicts virtual machines which talk or communicate with each other. In the example protocol managing topology 406 of FIG. 4D the relationship which involves the virtual machines 430 and 434 and physical switches 440, 442, and 444 represent which of the virtual entities of the enterprise network (virtual machines) manages which physical entities of the enterprise network 105 (physical switch).

Each relationship depicted in the example protocol managing topology 406 may be represented in the relationship table datastore 222 in a relationship entry. In the example logical application topology 402 of FIG. 4B depicts virtual machines which talk or communicate with each other and does not depict the physical switches which are connected to the virtual machines.

With the help of the reporting module 218, the IT administrator may be able to traverse coexisting topologies of the enterprise network. Using the example topologies discussed above, the IT administrator may query topologies independently, aggregate the topologies and output the aggregated topology. An example of this may be seen in FIGS. 4A through 4D. Assuming that the IT administrator inputs one query for a topology of FIG. 4A, the topologies module 216 may receive the query topology and search the object table datastore 220 and the relationship table datastore 222 for the object entries and relationship entries associated with the query topology. Once the topologies module 216 identifies all the object entries and relationship entries which match the query received from the IT administrator, the topologies module 216 may send a request to the topology datastore 226 to create a table entry for each of the three query topologies.

The IT administrator may submit three more query topologies for topologies FIG. 4B through 4D. The topologies module 216 may create a table entry for each of the three query topologies. The topologies module 216 may receive the three query topologies and search the object table datastore 220 and the relationship table datastore 222 for the object entries and relationship entries associated with each of the three query topologies. Once the topologies module 216 finds all the object entries and relationship entries which match the query received from the IT administrator, the topologies module 216 may send a request to the topology datastore 226 to create a table entry for each of the three query topologies.

The reporting module 218 may receive the table entry from the topology datastore 226. In response to receiving the table entry from the topology datastore 226, the reporting module 218 may output at least one of the four queried topologies stored in the topology datastore 226. The IT administrator may choose to add or remove one of the four queried topologies, or any other topology stored in the topology datastore 226 to generate a new aggregate topology. The reporting module 218 may send a request to the topology datastore 226 to create a table entry for the new aggregate topology.

Figure 5:
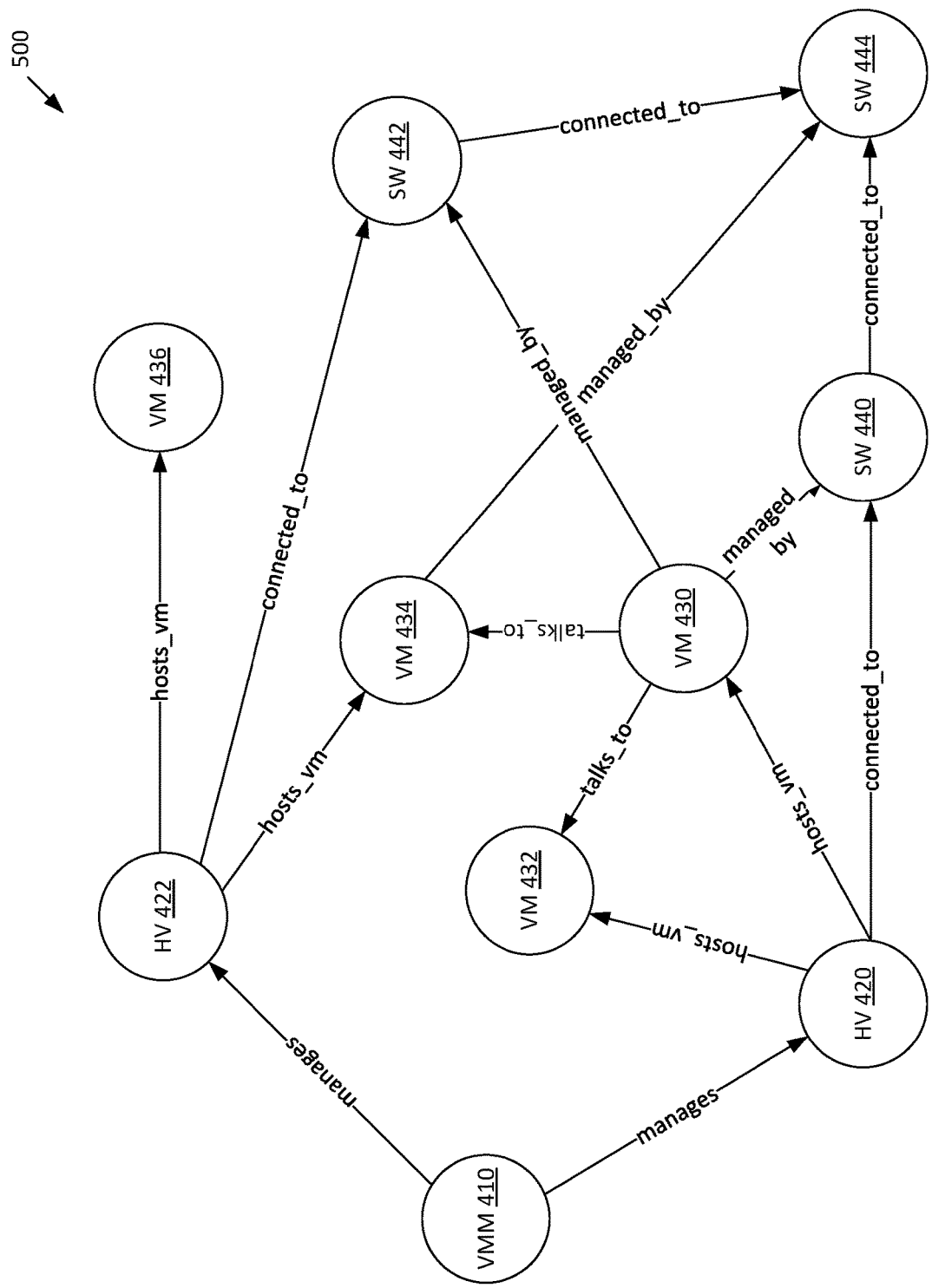
FIG. 5 depicts an example aggregate topology which shows all the relationships seen in the topologies depicted in FIG. 4A through 4D according to some embodiments.

FIG. 5 depicts an example aggregate topology 500 which is an aggregate of topologies depicted in FIG. 4A through 4D. The reporting module 218 may output the example aggregate topology The IT administrator may choose to interact with the network objects or entities outputted in the example aggregate topology 500 to obtain more information regarding the network object. For example, IT administrator may interact with the virtual machine manager 410 of FIG. 5 to obtain more information regarding the virtual machine manager 410, such as metrics associated with the virtual machine manager 410.

Figure 6A:
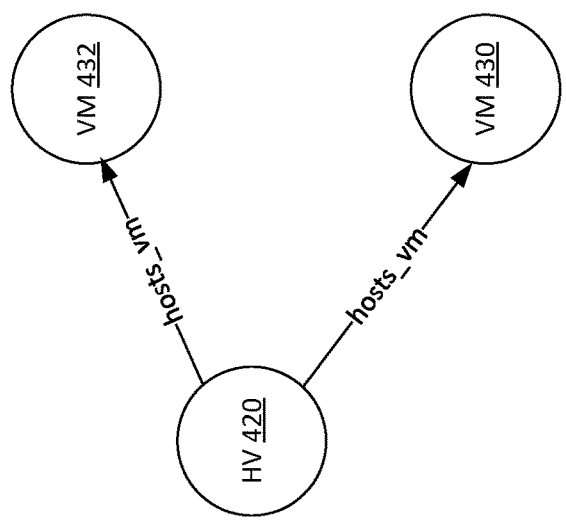
FIG. 6A depicts one example topology of a first segment of a chain of topologies.

Another way to traverse coexisting topologies include chaining the topologies by querying one topology, output the queried topology and using the outputted topology as a filter or starting point for subsequent topologies. FIG. 6A depicts a first segment of a chain of topologies. Topology 600 may represent the first segment of the chain of topologies. The IT administrator may interact with a query topology input interface outputted by the reporting module 218 and submit a query for virtual machines hosted by a hypervisor. The IT administrator may specify a particular hypervisor, or other virtual or physical entity of the enterprise network 105 by providing a unique identifier associated with the hypervisor.

Figure 6B:
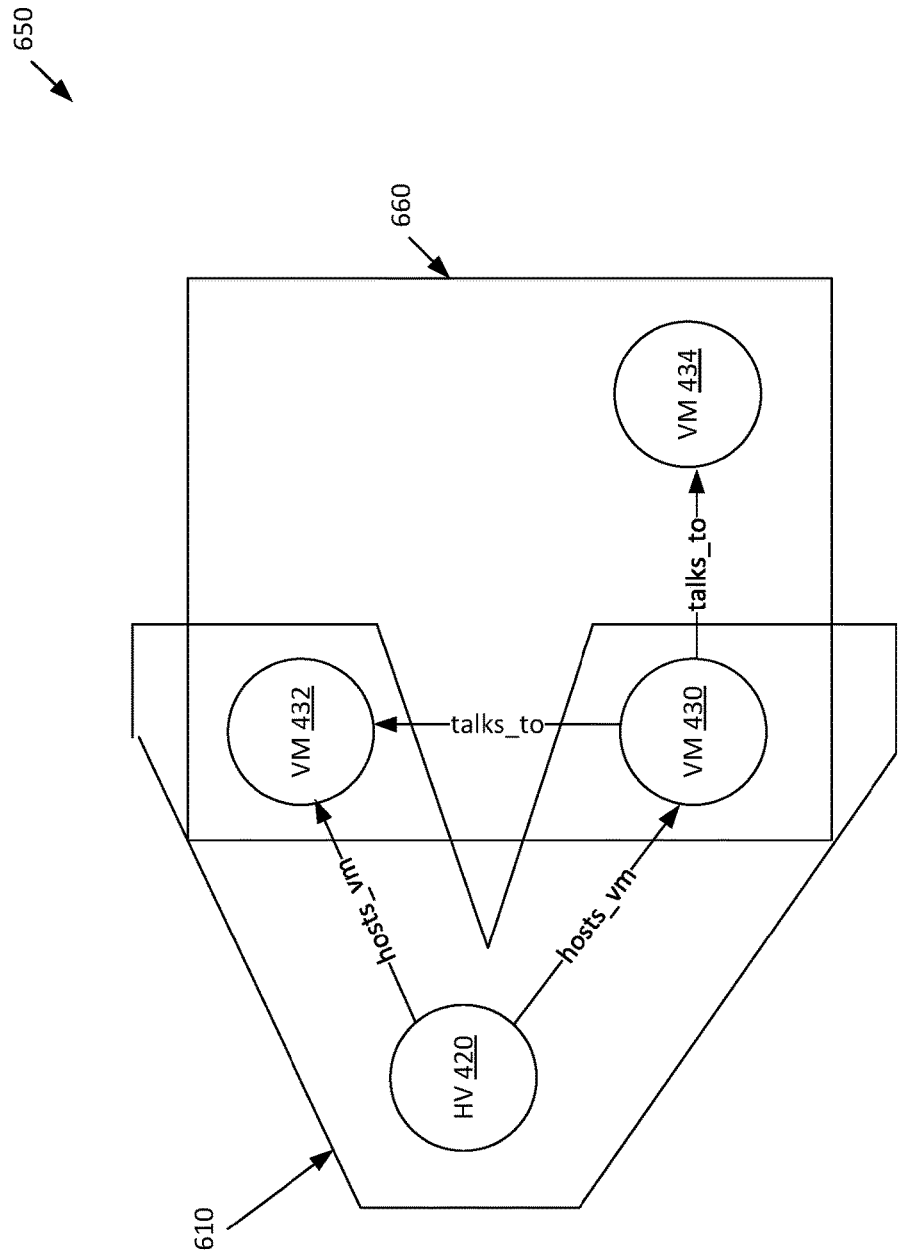
FIG. 6B depicts one example topology of a second segment of the chain of topologies.

For example, the reporting module 218 may output the one topology 600 on a graphics display 710. The IT administrator may interact with an icon representing the virtual machine 430 on the graphics display 710 using a cursor control device 714. The graphics display 710 may display a menu which may allow the IT administrator to determine a starting point for a subsequent topology. For example, the IT administrator may interact with the icon representing the virtual machine 430 to view virtual machines which communicates with or talk to. The topologies module 216 may receive the subsequent query topology, the topologies module 216 may send the subsequent query topology to the topology datastore 226 to create a table entry for the aggregate topology which includes the one topology and the subsequent topology. Topology 650 of FIG. 6B may represent a second segment of the chain of topologies. The second segment of the chain of topologies may comprise the first segment. The second segment may represent an aggregate topology 650 and includes a sub-topology 610 and a sub-topology 660. The sub-topology 610 represents the one topology 600 obtained in response to one query topology. The sub-topology 660 represents the subsequent topology and depicts virtual machines which communication with each other.

The graphics display 710 may display the menu which shows the types of topologies which may be available depending on the entity of the enterprise network 105 that the IT administrator interacts with. For example, the relationship types available to virtual machines for a subsequent topology may include other virtual machines a particular virtual machine communicates with or talks to, or physical switches managed by the particular virtual machine by some managing/monitoring protocol such as SNMP.

The object table datastore 220 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The object table datastore 220 may receive a request from the parsing module 212 to create or update an object entry. A newly created or newly updated object entry may be updated to an object table. The object table may include object entries. Each object entry may represent one entity or network object of the enterprise network 105. Network objects includes physical and virtual entities of the network which communicate with each other by receiving, sending, and transmitting data. In some embodiments, network objects include virtual machines (VMs), hosts, applications, servers, routers, switches, and storage devices. In various embodiments, network objects include host bus adapter (HBA) card, storage volume, storage port, storage pool, disks, input/output (I/O) groups, and nodes.

The relationship table datastore 222 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The relationship table datastore 222 may receive a request from the parsing module 212 to create or update a relationship entry. A newly created or newly updated relationship entry may be updated to a relationship table. Each object entry may be associated with more than one relationship entry. Each relationship entry links a first object to a second object. Each relationship entry may include a name, an entity type, and a unique identifier associated with the first object and a name, an entity type, a type of relationship between the first and second object, and a unique identifier associated with the second object and the type of relationship between the first and second objects.

The link table datastore 224 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The link table datastore 224 may receive a request to create or update a link entry. The link entry may be based on the linking of one object entry with at least one relationship entry or linking two object entries together.

The topology datastore 226 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The topology datastore 226 may receive a request from the topologies module 216 to create a table entry. The table entry may include the contents of all of the object entries and relationship entries that make up the query topology that makes up the table entry. By storing the contents of the object entries and relationship entries which make up a query topology, the user of the coexisting topologies discovery system 165 may be able to quickly retrieve queried topologies. In some embodiments, the table entry may include pointers to the object entries in the object table datastore 220 and the relationship entries in the relationship table datastore 222 which make up the query topology. An advantage of this data structure is that if one or more object entries or relationship entries which make up the query topology is updated, the user of the coexisting topologies discovery system 165 may be able to obtain a real-time view of the query topology without having to submit a new query. In some embodiments, the master topology may be stored in the topology datastore 226. A table entry associated with the master topology may be stored in the topology datastore 226.

Figure 3:
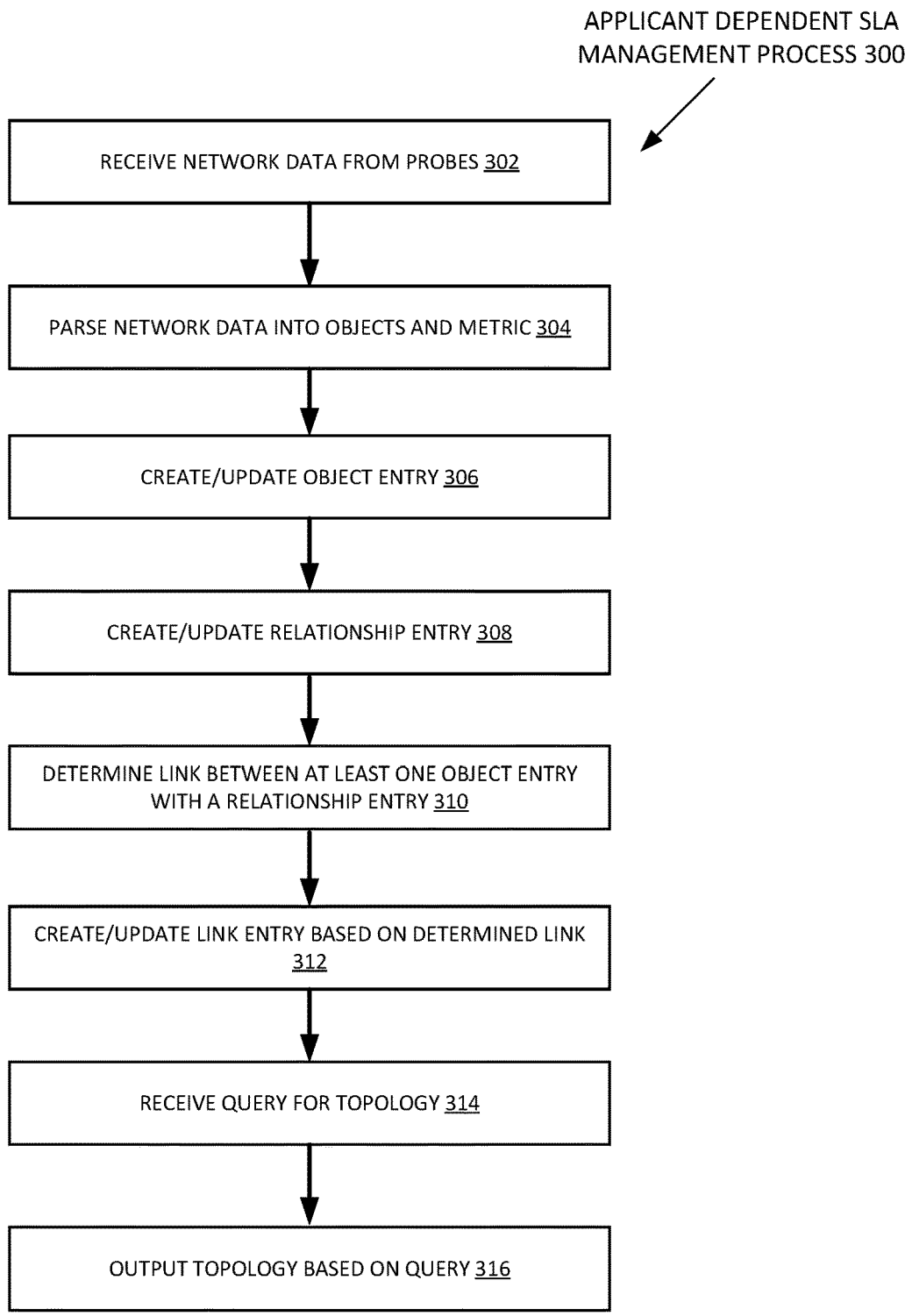
FIG. 3 depicts a flowchart of a coexisting topologies discovery process of an enterprise system according to some embodiments.

FIG. 3 depicts a flowchart 300 of a coexisting topologies discovery process of an enterprise system according to some embodiments.

In step 302, the communication module 202 send a request to the probes 155 for network data. The probe input module 210 may receive the network data from the probes 155. The network data may include network traffic data from a network traffic software platform, virtualization data from the virtualization software platform such as VMware vSphere, and application data from the application discovery system 170. In some embodiments, the network traffic data may be received by the network traffic integration module 208.

In step 304, the parsing module 212 may parse the received network data to identify object data and relationship data. The received network data may include at least two of: network traffic data, virtualization data, and application data.

The parsing module 212 may receive the virtualization data received by the probe input module 210 and parse the received virtualization data to identify object data and relationship data. Object data may be identified using a universal unique identifier (UUID) or any other identifier or combination of identifiers. In some embodiments, the parsing module 212 may identify relationship data by reviewing the virtualization data to identify if the source port and destination port of IP data traffic matches that of virtual serial ports of two virtual computing devices such as a virtual machine manager, a hypervisor or a virtual machine. In some embodiments, the virtual computing devices may be identified using the universal unique identifier. In various embodiments, the virtual computer devices may be identified using an IP address. Once the virtual computing devices involved in the IP data traffic has been identified, the parsing module 212 may determine the type of relationship that exist between the two virtual computing devices.

The parsing module 212 may receive application data from the input module 204 and parse the application data into object data and/or relationship data. Object entries may be created for each application instance, and entities of the enterprise network which make up the application instance. In one embodiment, relationship data parsed from the application data may include the relationship between two or more object entries, such as linking an object entry associated with an application instance to another object entry associated with an entity of the enterprise network which make up the application instance.

In step 306, the parsing module 212 may send a request to the object table datastore 220 to create or update an object entry based on the parsed object data. In some embodiments, the topology control module 206 may send the request to the object table datastore 220 to create or update the object entry. Each object entry may represent one network object of the enterprise network 105. In some embodiments, network objects include virtual machine managers, hypervisors, virtual machines (VMs), hosts, applications, servers, routers, switches, and storage devices.

In step 308, the parsing module 212 may send a request to the relationship table datastore 222 to create or update a relationship entry based on the parsed relationship data. In some embodiments, the topology control module 206 may send the request to the relationship table datastore 222 to create or update the metric entry. Each metric entry may represent one metric associated with one network object of the enterprise network 105.

In step 310, the linking module 214 may determine a link between an object entry and a metric entry. In some embodiments, the link entry may link two object entries together or one relationship entry with one object entry.

In step 312, the linking module 214 may send a request to the link table datastore to create or update a link entry based on the link determined by the linking module 214. A link entry links an object entry with a relationship entry. The link entry may be updated as the relationship associated with the link changes.

In step 314, the input module 204 may receive a query topology from the IT administrator. The input module 204 may send the query topology to the topologies module 216 may receive the query topology and search the object table datastore 220 and the relationship table datastore 222 for the object entries and relationship entries associated with the query topology. Once the topologies module 216 finds all the object entries and relationship entries which match the query received from the IT administrator, the topologies module 216 may send a request to the topology datastore 226 to create a table entry for the query topology.

In step 316, the reporting module 218 may receive the table entry from the topology datastore 226 and output the queried topology based on the received table entry. The IT administrator may wish to traverse multiple coexisting topologies. Multiple topologies may be combined in multiple ways: i) topologies may be queried independently, aggregate the topologies and output the aggregated topology; and ii) chain the topology by querying one topology, output the queried topology and use the outputted topology as a filter or starting point for subsequent topologies.

Figure 7:
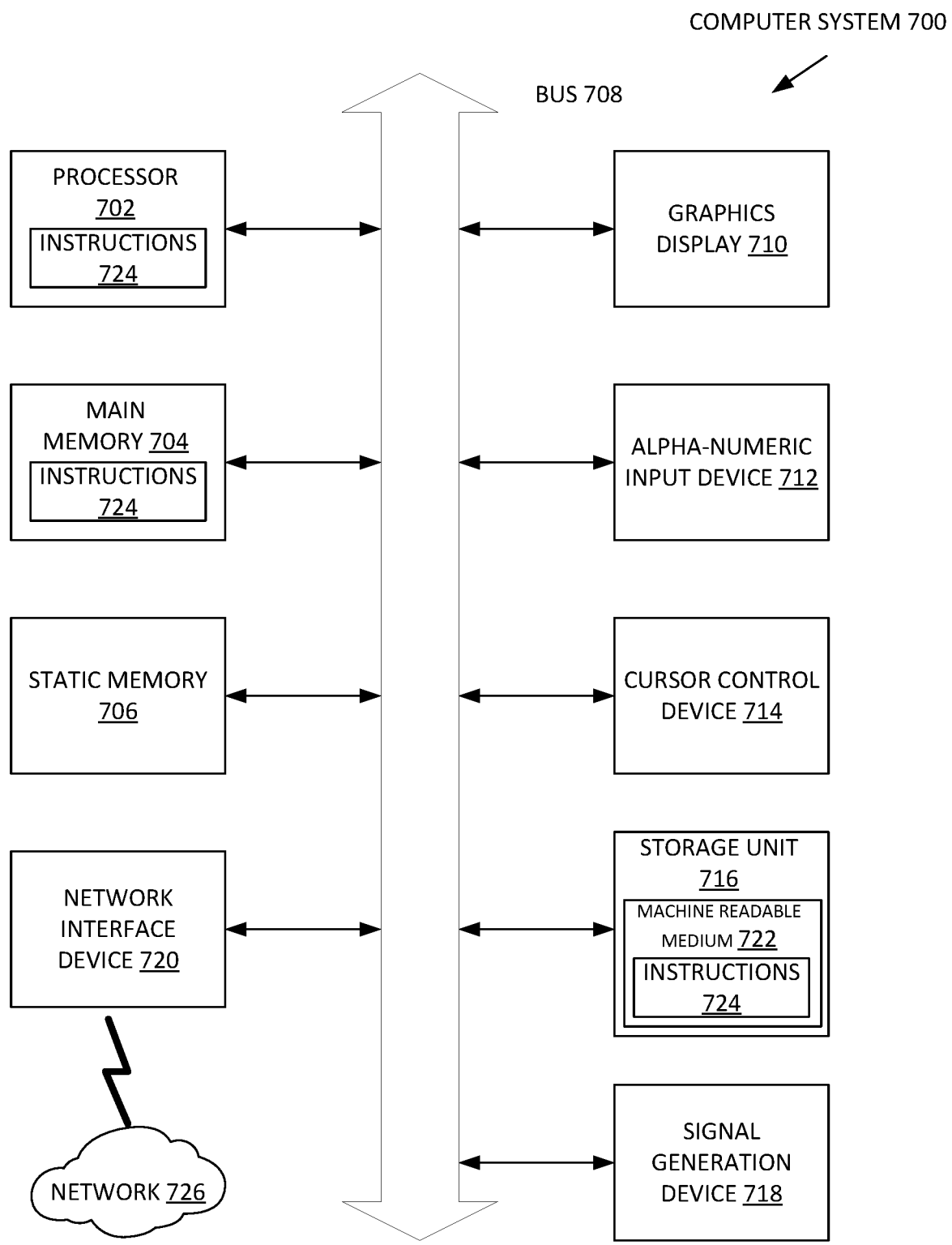
FIG. 7 depicts a block diagram illustrating entities of an example machine according to some embodiments.

FIG. 7 is a block diagram illustrating entities of an example machine able to read instructions from a machine-readable medium and execute those instructions in a processor to perform the machine processing tasks discussed herein, such as the engine operations discussed above. Specifically, FIG. 7 shows a diagrammatic representation of a machine in the example form of a computer system 700 within which instructions 724 (e.g., software) for causing the machine to perform any one or more of the methodologies discussed herein may be executed. In alternative embodiments, the machine operates as a standalone device or may be connected (e.g., networked) to other machines, for instance via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (SIB), a personal digital assistant (PDA), a cellular telephone, a smartphone, a web appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes a processor 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include graphics display unit 710 (e.g., a plasma display panel (PDP), a liquid crystal display (LCD), a projector, or a cathode ray tube (CRT)). The computer system 700 may also include alphanumeric input device 712 (e.g., a keyboard), a cursor control device 714 (e.g., a mouse, a trackball, a joystick, a motion sensor, or other pointing instrument), a data store 716, a signal generation device 718 (e.g., a speaker), an audio input device 726 (e.g., a microphone) and a network interface device 720, which also are configured to communicate via the bus 708.

The data store 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network (not shown) via network interface 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions instructions 724) for execution by the machine and that cause the machine to perform any one or more of the methodologies disclosed herein. The term "machine-readable medium" includes, but should not be limited to, data repositories in the form of solid-state memories, optical media, and magnetic media.

Figure 8:
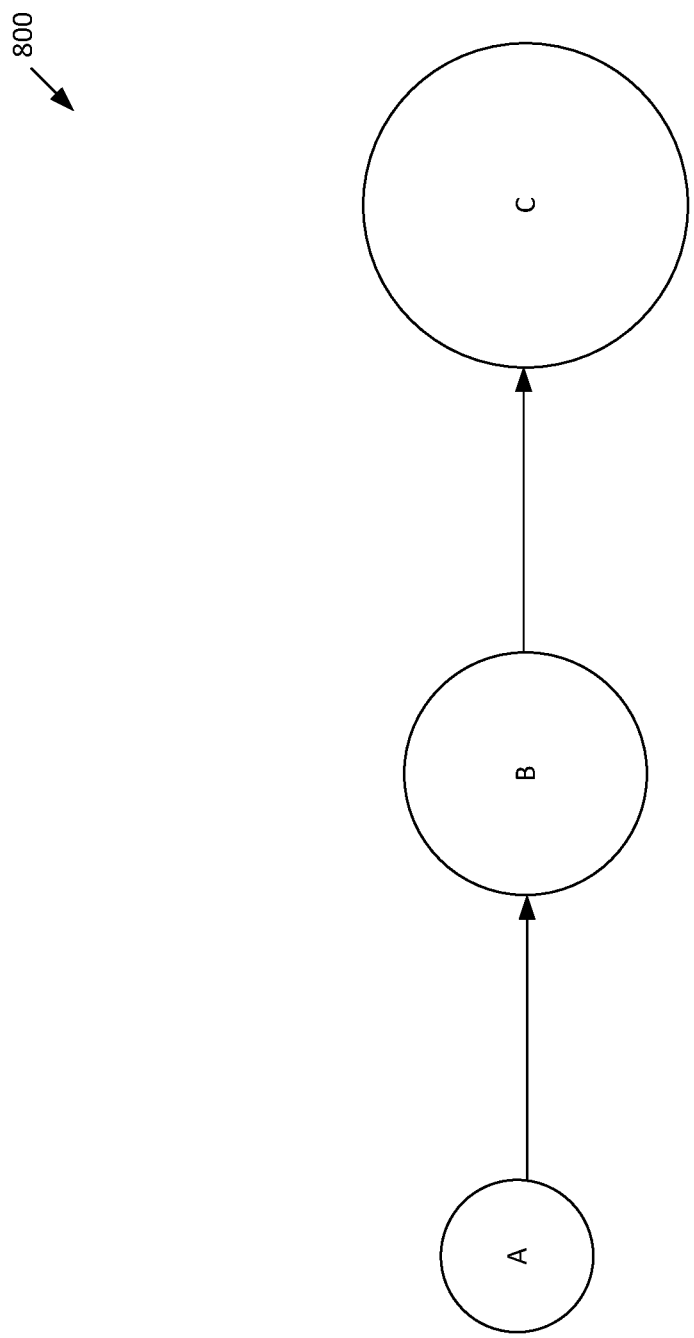
FIG. 8 depicts an example directed topology.

FIG. 8 depicts an example directed topology 800. In the directed or directional topology 800, element A is directionally connected to element B. Element B is, in turn, directionally connected to element C as depicted in FIG. 8.

Figure 9:
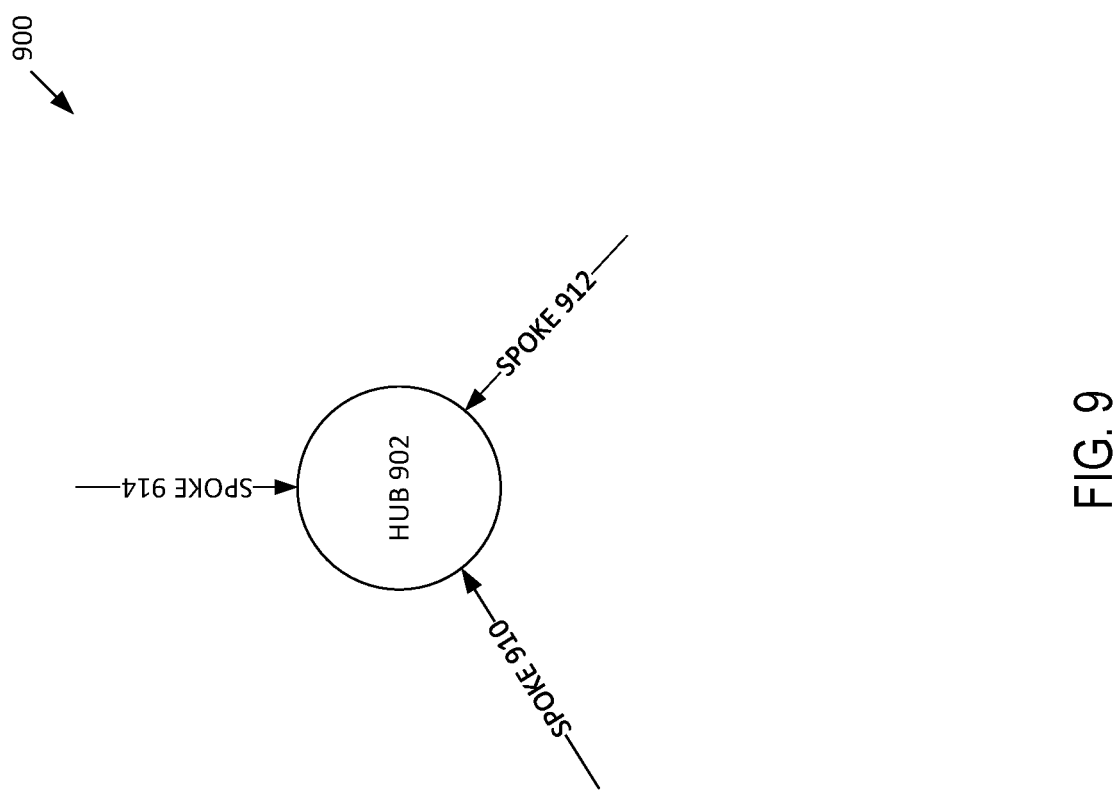
FIG. 9 depicts an example of a hub and spoke topology.

FIG. 9 depicts an example of a hub and spoke topology 900. The hub and spoke topology 900 include a hub 902 and spokes 910, 912, and 914. The multiple spokes represent how objects or entities of the enterprise system (not illustrated) are directionally related to the central hub. The concept of hub and spoke topologies may be utilized to aid in defining one or more mini-topologies, how to the element or object of the one or more mini-topologies are related to one another. The spoke of the hub and spoke topology 900 may be treated as a directed topology definition. The directionality may be utilized to describe the cardinality of the relationship between two elements on either side of the spoke. In some embodiments, the spokes of the huh and spoke topology 900 does not represent how objects are directionally related, in other words, the spokes of the hub and spoke topology 900 may just represent that two objects are related.

The coexisting topologies discovery system may receive queries to traverse a directed topology, such as the directed topology 800 of FIG. 8 until the user reaches a pivot point. In some embodiments, the pivot point, as illustrated in the directed topology of FIG. 10A, may be an object or element of the directed topology which three or more objects or elements are directionally related to. For example, the directed topology of FIG. 10A illustrates that multiple objects (not shown) directionally connected to a pivot point 1010. Specifically, three objects traverse into the pivot point 1010. The coexisting topologies discovery system may determine if a particular entity or object of the enterprise system is a pivot point based on relationship entries associated with the particular entity or object. For example, the coexisting topologies discovery system may determine the particular entity or object is a pivot point if at least one object traverses into the pivot point.

Figure 10B:
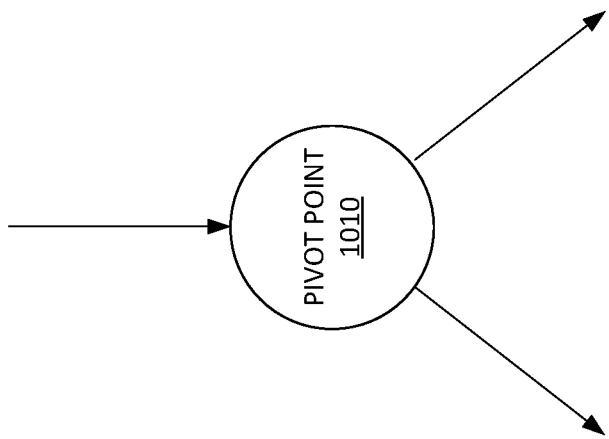
FIG. 10B depicts an example of traversal and pivot of a topology according to some embodiments.
Figure 10A:
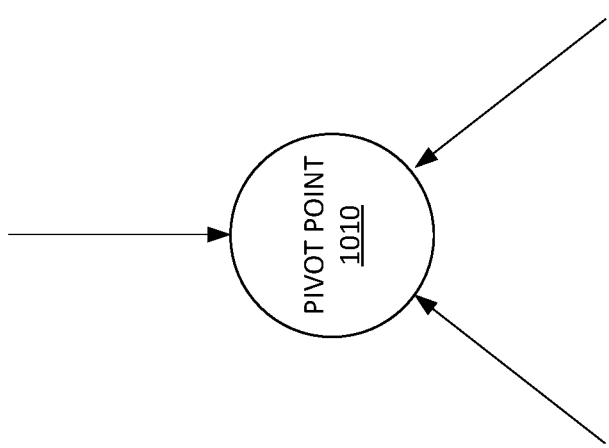
FIG. 10A depicts one example hub and spoke topology according to some embodiments.

The user of the coexisting topologies discovery system may choose to utilize the pivot point to query additional related entities and traverse the pivot point 1010 to other entities of the enterprise system, as illustrated in FIG. 10B. The additionally related entities may have a different relationship to the object associated with the pivot point. For example, the coexisting topologies discovery system may receive queries of one relationship to obtain the directional topology of FIG. 10A. In some embodiments, a directional topology presents a directionality property in the relationship between one object to another object. Once the user has chosen the pivot point 1010, the user to query another relationship that the entity associated with the pivot point 1010, as represented in the directional topology of FIG. 10B. In response to the query, the coexisting topologies discovery system may output a topology that represents the different relationships, such as the one relationship which generated the topology in FIG. 10A and another relationship that generated the topology in FIG. 10B.

In some embodiments, the topologies illustrated in FIGS. 10A and 10B may be mini-topologies. The coexisting topologies discovery system may identify one or more entities of the enterprise network based on identifiers associated with each entity. The coexisting topologies discovery system may create or update an object entry based on discovered object data. The newly created or newly updated object entry may be updated to an object table. Each object entry may include attributes or properties of the network object. In some embodiments, the coexisting topologies discovery system may create or update a relationship entry based on relationship data associated with one or more object entries of the enterprise network. In some embodiments, relationship data may include a directionality component, for example, a virtual machine manager manages a hypervisor, however, the hypervisor may not manage the virtual machine manager. A newly created or newly updated relationship entry may be updated to a relationship table. Each relationship entry includes attributes or properties of the relationship.

The coexisting topologies discovery system may receive queries to traverse out of one mini-topology and into another mini-topology while continuing to respect the directionality of previously defined topologies such as the directed or directional topology. In some embodiments, may receive queries to traverse out of one mini-topology and into another topology while at the same time keeping the directionality of the topologies involved. The coexisting topologies discovery system may allow a user to traverse a topology, identify a pivot point, or an object of interest, traverse from the pivot point to other objects of the master topology.

Figure 11:
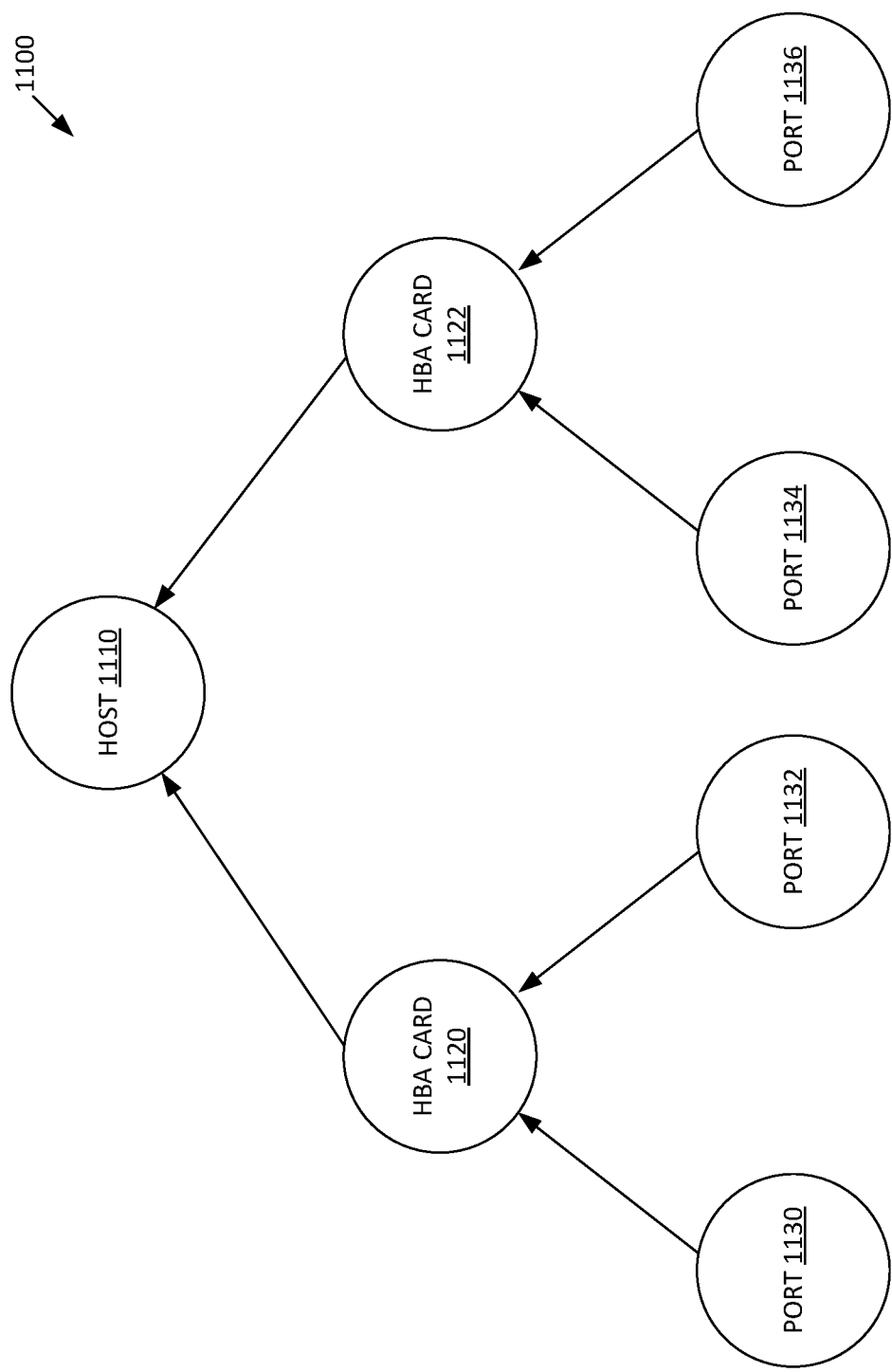
FIG. 11 depicts a graphical representation of an example mini-topology according to some embodiments.

FIG. 11 depicts a graphical representation of an example mini-topology 1100 according to some embodiments. Each instance of a host object in an enterprise system 100, such as a host 1110, includes multiple instances of HBA cards such as an HBA card 1120 and HBA card 1122. Each HBA card, in turn, may be connected to one or more ports, such as one of ports 1130, 1132, 1134, and 1136. The mini-topology 1100 may be a directional topology, such that if a user sends a request to the coexisting topologies discovery system for object entries related to the port 1130, the coexisting topologies discovery system may not discover other HBA cards such as the HBA card 1122. In some embodiments, the mini-topology may represent one or more relationships between multiple objects of the enterprise system.

Figure 12:
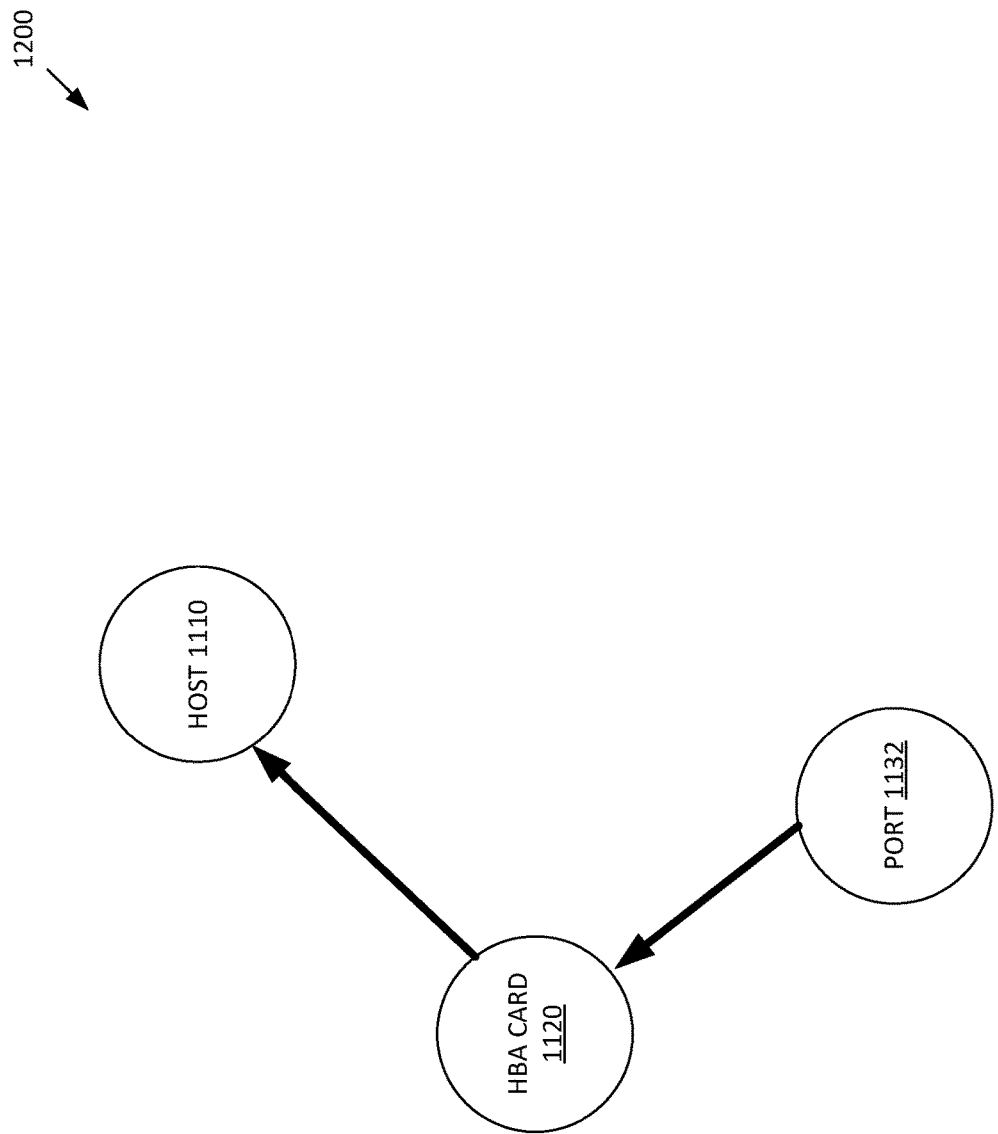
FIG. 12 depicts a graphical representation of a traversal of the example mini-topology of FIG. 11, starting from one particular node according to some embodiments.

A starting point or pivot point of a topology may determine the components of the enterprise system outputted by the coexisting topologies discovery system. For example, FIG. 12 depicts a graphical representation 1200 of a traversal of the example mini-topology of FIG. 11 starting from the port 1132. The coexisting topologies discovery system may output a representation of a mini-topology, which includes the port 1132, the HBA card 1120, and the host 1110. The port 1132 is connected to the HBA card 1120. The HBA card 1120 is, in turn, is a part of the host 1110. This particular traversal of the mini-topology 1100 does not show representation of the port 1130, 1134, and 1136 as well as the HBA card 1122.

Figure 13:
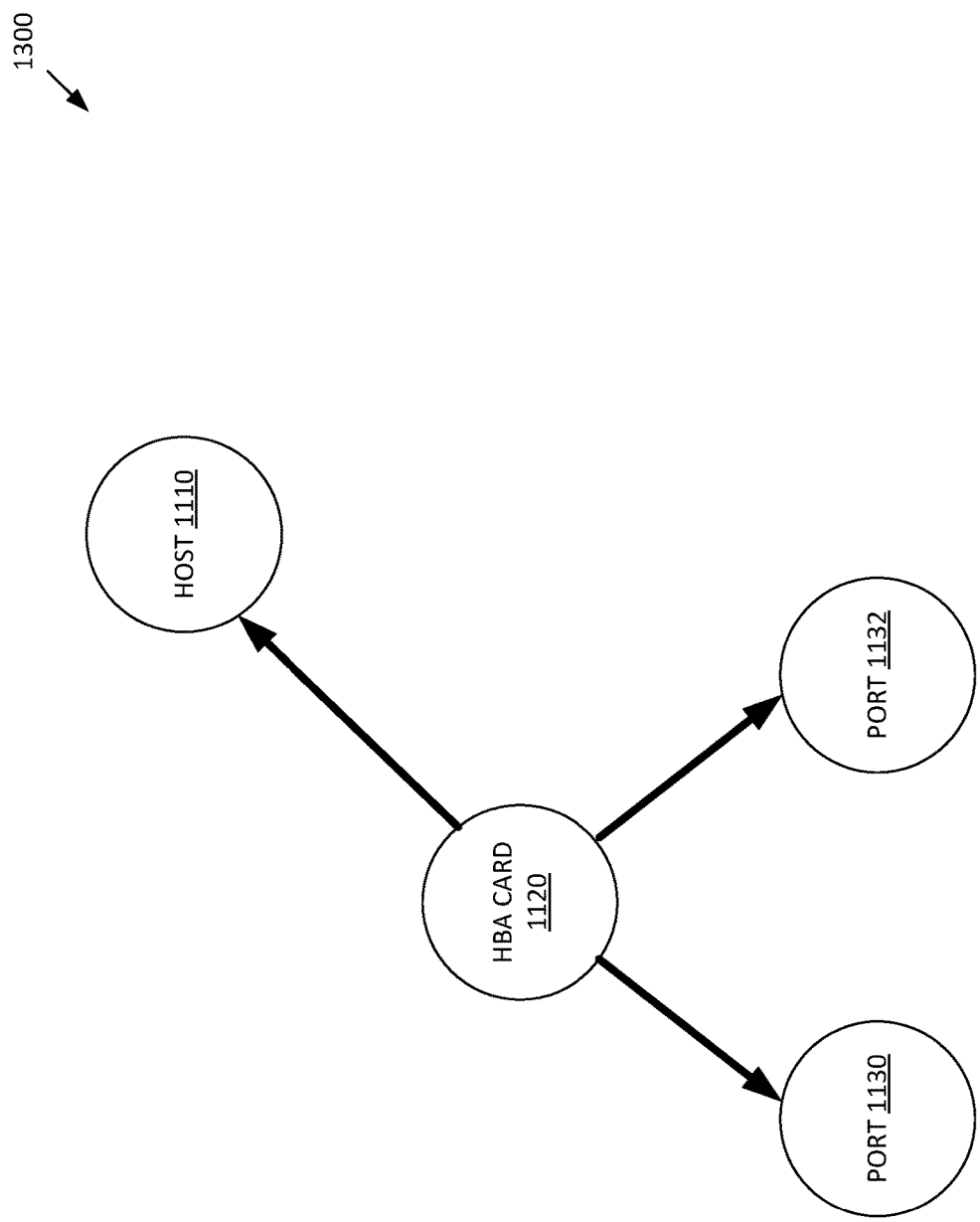
FIG. 13 depicts a graphical representation of a traversal of the example mini-topology of FIG. 8, starting from another particular node according to some embodiments.

In another example, FIG. 13 depicts a graphical representation 1300 of a traversal of the example mini-topology of FIG. 11 starting from the HBA card 1120. Starting at the HBA card 1120 as a pivot point, the coexisting topologies discovery system may output a representation of a mini-topology, which includes the ports 1130 and 1132, the HBA card 1120, and the host 1110. This particular traversal of the mini-topology 1100 does not show representation of the port 1134 and 1136 as well as the HBA card 1122.

Figure 14A:
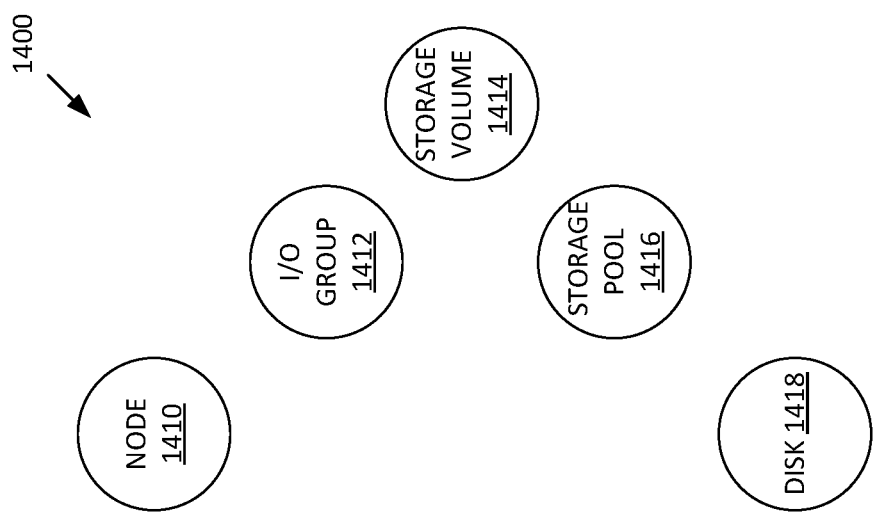
FIG. 14A depicts an example of a directional topology to a pivot point according to some embodiments.
Figure 14B:
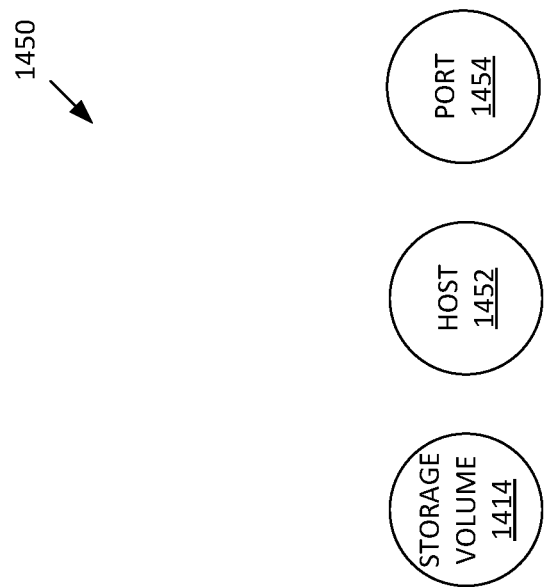
FIG. 14B depicts another example hub and spoke topology according to some embodiments.

FIGS. 14A and 14B depict graphical representations two hub and spoke topologies. In some embodiments, one or more of the hub and spoke topologies of FIGS. 14A and 14B may be a directed topology. Multiple hub and spoke topologies may be combined to generate a linked topology. For example, a user of the coexisting topologies discovery system may receive one query for entities of the enterprise system, which has one type of relationship with a particular storage volume, such as a storage volume 1414. The coexisting topologies discovery system may output the graphical representation 1400 of FIG. 14A, which may be a hub and spoke topology that includes a node 1410, an I/O group 1412, the storage volume 1414, a storage pool 1416, and a disk 1418 based on a query received by the user of the coexisting topologies discovery system.

The user of the coexisting topologies discovery system may receive another query for objects of the enterprise system. Another query may require objects with another type of relationship with the particular storage volume. The coexisting topologies discovery system may output the hub and spoke topology 1450 of FIG. 14B, which includes the storage volume 1414, a host 1452, and a port 1454. The coexisting topologies discovery system may receive a request to connect the two hub and spoke topologies 1410 and 1450 using an object or entity common to the two topologies, such as the storage volume 1414.

Figure 15:
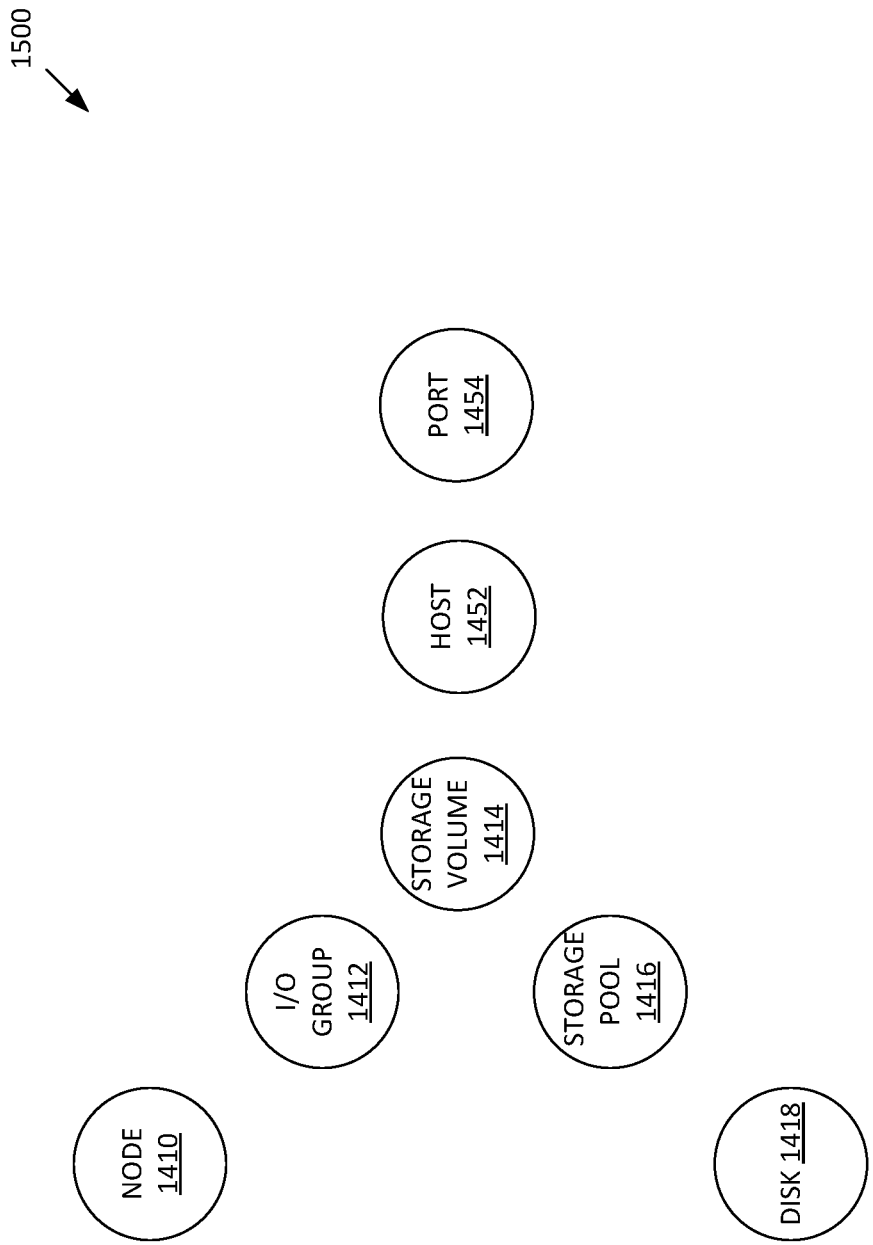
FIG. 15 depicts an example of the hub and spoke topologies of FIGS. 14A and 14B combined according to some embodiments.
Figures 16A, 16B:
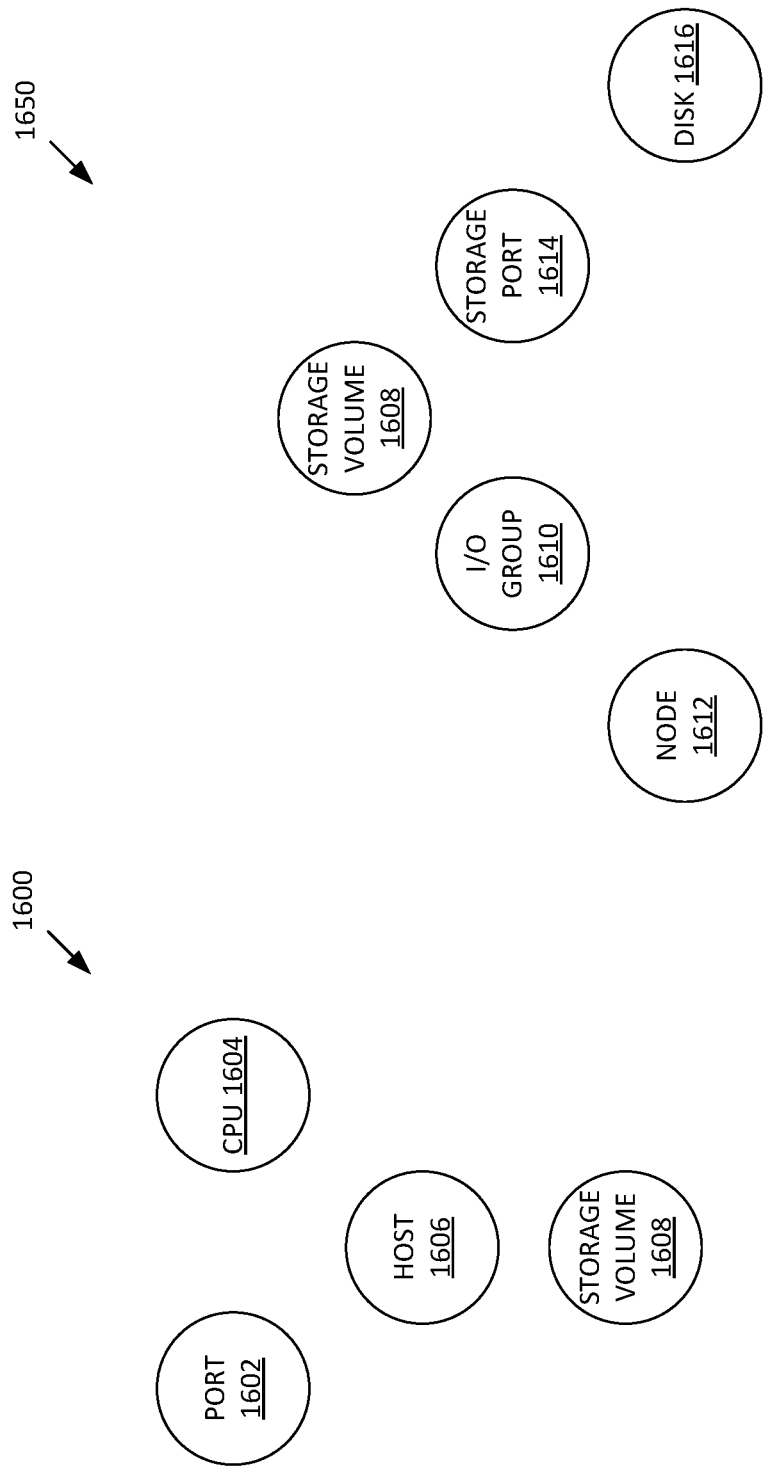
FIG. 16A depicts a host, port, CPU hub and spoke traversal according to some embodiments.
FIG. 16B depicts a node, I/O group, storage pools, and disks hub and spoke traversal according to some embodiments.

The result of the connection of the hub and spoke topologies 1410 and 1450 of FIGS. 14A and 14B respectively may be a hub and spoke topology 1500 of FIG. 15. The hub and spoke topology 1500 allows a user of the coexisting topologies discovery system to begin at the port 1454, traverse to the host 1452 and the storage volume 1414, pivot, traverse out to the I/O group 1412 and the node 1410 and the storage pool 1416 and the disk 1418. The coexisting topologies discovery system may receive one query FIGS. 16A and 16B depict two more examples of hub and spoke topologies 1600 and 1650. Similar to FIGS. 14A and 14B, the coexisting topologies discovery system may receive one search query. The search query may specify one or more of a particular entity, a type of entity, and a type of relationship. The coexisting topologies discovery system may take the search query and output one topology, such as the hub and spoke topology 1600 of FIG. 16A. In some embodiments, the topology is a directional or directed topology. The hub and spoke topology 1600 of FIG. 16A includes a port 1602, a CPU 1604, a host 1606, and a storage volume 1608.

The coexisting topologies discovery system may receive another search query, this search query may specify one or more of a particular entity, a type of entity, and a type of relationship. The coexisting topologies discovery system may take the search query and output another topology, such as the hub and spoke topology 1650 of FIG. 16A. The huh and spoke topology 1650 of FIG. 16B includes the storage volume 1608, an I/O group 1610, a node 1612, a storage port 1614, and a disk 1616. The hub and spoke topologies 1600 and 1650 share a common entity or object in the storage volume 1608.

Figure 17:
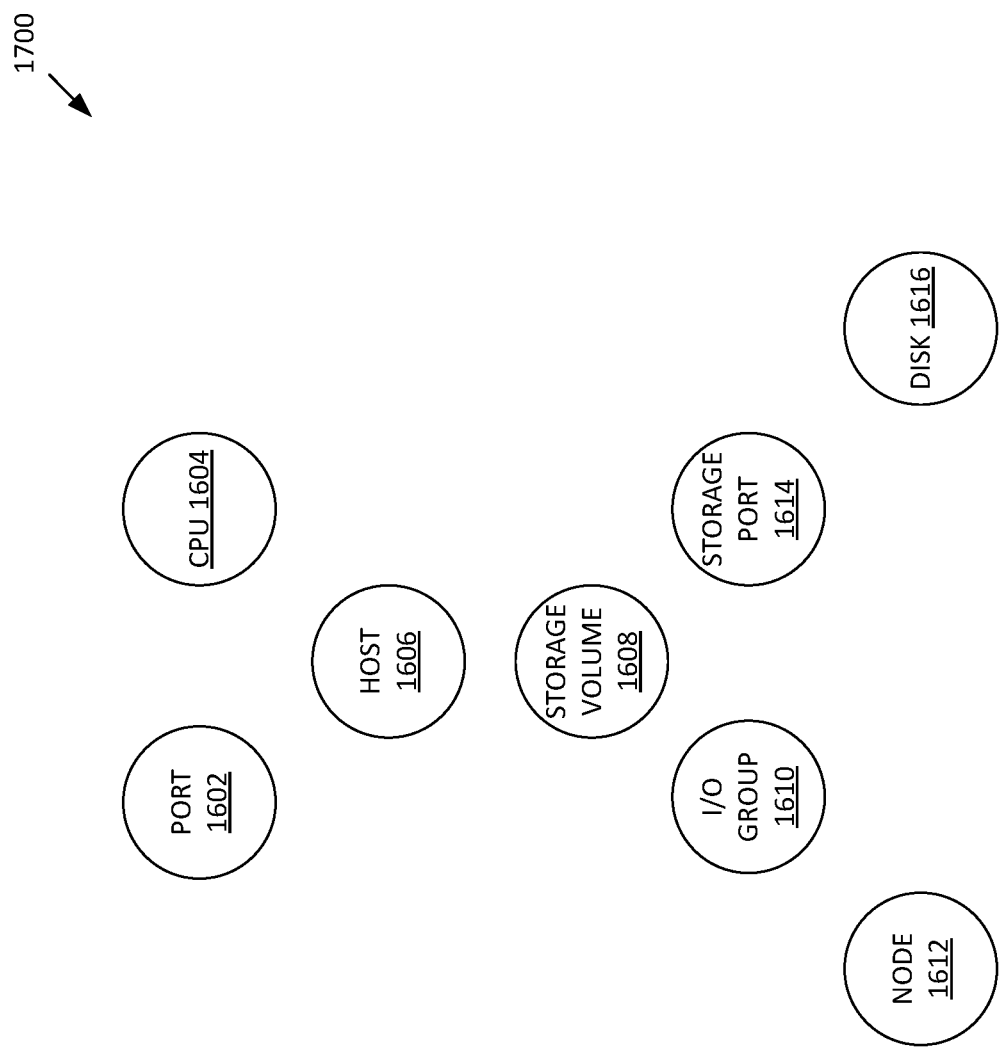
FIG. 17 depicts an example of the hub and spoke topologies of FIGS. 16A and 16B combined according to some embodiments.

The coexisting topologies discovery system may receive a request to connect the topologies to produce a multi-connection hub and spoke topology 1700 of FIG. 17. This may be accomplished by starting from the port 1302, traversing the topology to search for objects of the enterprise system, such as CPUs that are related, or have a relationship to the port 1602. In some embodiments, the coexisting topologies discovery system may receive a request to generate a topology that includes CPU, storage volume, hosts, storage port, and other objects of the enterprise system which are related or have a relationship with the port 1602. In some embodiments, the generated topology excludes other ports or objects which do not have a relationship with the port 1602. In various embodiments, the multi-connection hub and spoke topology 1700 provides a representation of a subset of the master topology of the enterprise system while at the same time respecting the directionality of the mini-topologies which make up the multi-connection hub and spoke topology 1700.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It may be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors as described above in connection with FIG. 7. Alternatively, hardware or software modules may be stored elsewhere within a computing system.

As referenced herein, a computer or computing system includes hardware elements used for the operations described here regardless of specific reference in FIG. 7 to such elements, including for example one or more processors, high speed memory, hard disk storage and backup, network interfaces and protocols, input devices for data entry, and output devices for display, printing, or other presentations of data. Numerous variations from the system architecture specified herein are possible. The entities of such systems and their respective functionalities can be combined or redistributed.

The invention claimed is:

1. A method comprising:
   receiving object identifiers associated with each entity of a plurality of entities of an enterprise network, each entity of the plurality of entities being a monitored object of the enterprise network, each entity being one of a physical storage device, cloud-based storage device, physical computing device, virtual computing device, server, fiber optical channel, router, or switch;
   receiving relationship data indicating directionality of data flow between two or more entities of the plurality of entities of the enterprise network;
   receiving, from a user, a first search query, the first search query including at least one of an object identifier associated with one of the plurality of entities or relationship data indicating directionality of data flow associated with one of the plurality of entities in an enterprise network;
   traversing at least a portion of a topology of the enterprise network based on the first search query to identify objects of the at least the portion of the topology and a pivot point, the pivot point being directionally coupled to at least three objects of the enterprise network, the pivot point being a host bus adapter, the relationship data associated with the host bus adapter indicating data flowing out of a host object to the host bus adapter and data flows into at least two ports of the host bus adapter;
   identifying at least two mini-topologies based on at least two objects of the at least three objects of the pivot point;
   traversing each of the at least two mini-topologies based on the at least two objects of the at least three objects of the pivot point to identify further objects within the at least the portion of the topology;
   generating at least a partial topology of the enterprise network based on the traversal of the at least the portion of the topology and the traversal of the mini-topologies; and
   providing an object identification information including objects identified in the at least the partial topology.

2. The method of claim 1 wherein the relationship data associated with the host bus adapter indicates data flowing out of a host object to the host bus adapter and data flows out at least two ports of the host bus adapter.

3. The method of claim 1 wherein the plurality of entities of the enterprise network further includes one or more of: storage volume, storage port, storage pool, disks, input/output (I/O) groups, and nodes.

4. The method of claim 1 wherein providing the object identification information including objects identified in the at least the partial topology includes generating a table of the object identification information.

5. The method of claim 1 wherein providing the object identification information including objects identified in the at least the partial topology includes generating a graphical representation of objects identified in the at least the partial topology.

6. A system comprising:
one or more processors; and
memory containing instructions configured to control the one or more processors to:
receive object identifiers associated with each entity of a plurality of entities of an enterprise network, each entity of the plurality of entities being a monitored object of the enterprise network, each entity being one of a physical storage device, cloud-based storage device, physical computing device, virtual computing device, server, fiber optical channel, router, or switch;
receive relationship data indicating directionality of data flow between two or more entities of the plurality of entities of the enterprise network;
receive, from a user, a first search query, the first search query including at least one of an object identifier associated with one of the plurality of entities or relationship data indicating directionality of data flow associated with one of the plurality of entities in an enterprise network;
traverse at least a portion of a topology of the enterprise network based on the first search query to identify objects of the at least the portion of the topology and a pivot point, the pivot point being directionally coupled to at least three objects of the enterprise network, the pivot point being a host bus adapter, the relationship data associated with the host bus adapter indicating data flowing out of a host object to the host bus adapter and data flows into at least two ports of the host bus adapter;
identify at least two mini-topologies based on at least two objects of the at least three objects of the pivot point;
traverse each of the at least two mini-topologies based on the at least two objects of the at least three objects of the pivot point to identify further objects within the at least the portion of the topology;
generate at least a partial topology of the enterprise network based on the traversal of the at least the portion of the topology and the traversal of the mini-topologies; and
provide an object identification information including objects identified in the at least the partial topology.

7. The system of claim 6 wherein the relationship data associated with the host bus adapter indicates data flowing out of a host object to the host bus adapter and data flows out at least two ports of the host bus adapter.

8. The system of claim 6 wherein the plurality of entities of the enterprise network further includes one or more of: storage volume, storage port, storage pool, disks, input/output (I/O) groups, and nodes.

9. The system of claim 6 wherein providing the object identification information including objects identified in the at least the partial topology includes generating a table of the object identification information.

10. The system of claim 6 wherein providing the object identification information including objects identified in the at least the partial topology includes generating a graphical representation of objects identified in the at least the partial topology.

11. A non-transitory computer readable medium including executable instructions, the instructions being executable by a processor to perform a method, the method comprising:
receiving object identifiers associated with each entity of a plurality of entities of an enterprise network, each entity of the plurality of entities being a monitored object of the enterprise network, each entity being one of a physical storage device, cloud-based storage device, physical computing device, virtual computing device, server, fiber optical channel, router, or switch;
receiving relationship data indicating directionality of data flow between two or more entities of the plurality of entities of the enterprise network;
receiving, from a user, a first search query, the first search query including at least one of an object identifier associated with one of the plurality of entities or relationship data indicating directionality of data flow associated with one of the plurality of entities in an enterprise network;
traversing at least a portion of a topology of the enterprise network based on the first search query to identify objects of the at least the portion of the topology and a pivot point, the pivot point being directionally coupled to at least three objects of the enterprise network, the pivot point being a host bus adapter, the relationship data associated with the host bus adapter indicating data flowing out of a host object to the host bus adapter and data flows into at least two ports of the host bus adapter;
identifying at least two mini-topologies based on at least two objects of the at least three objects of the pivot point;
traversing each of the at least two mini-topologies based on the at least two objects of the at least three objects of the pivot point to identify further objects within the at least the portion of the topology;
generating at least a partial topology of the enterprise network based on the traversal of the at least the portion of the topology and the traversal of the mini-topologies; and
providing an object identification information including objects identified in the at least the partial topology.

12. The non-transitory computer readable medium of claim 11 wherein the relationship data associated with the host bus adapter indicates data flowing out of a host object to the host bus adapter and data flows out at least two ports of the host bus adapter.

13. The non-transitory computer readable medium of claim 11 wherein the plurality of entities of the enterprise network further includes one or more of: storage volume, storage port, storage pool, disks, input/output (I/O) groups, and nodes.

14. The non-transitory computer readable medium of claim 11 wherein providing the object identification information including objects identified in the at least the partial topology includes generating a table of the object identification information.

* * * * *